US011455092B2

(12) United States Patent
Laflamme et al.

(10) Patent No.: US 11,455,092 B2
(45) Date of Patent: Sep. 27, 2022

(54) METHOD AND SYSTEM FOR MONITORING AND CONTROLLING OPERATIONAL SETTINGS IN A BATHING SYSTEM

(71) Applicant: GECKO ALLIANCE GROUP INC., Quebec (CA)

(72) Inventors: Benoit Laflamme, Quebec (CA); Christian Brochu, Quebec (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 2 days.

(21) Appl. No.: 17/073,537

(22) Filed: Oct. 19, 2020

(65) Prior Publication Data

US 2021/0132782 A1    May 6, 2021

Related U.S. Application Data

(63) Continuation of application No. 16/260,555, filed on Jan. 29, 2019, now Pat. No. 10,809,905, which is a
(Continued)

(51) Int. Cl.
*G06F 3/04847* (2022.01)
*A61H 33/00* (2006.01)
(Continued)

(52) U.S. Cl.
CPC ....... *G06F 3/04847* (2013.01); *A61H 33/005* (2013.01); *A61H 33/0087* (2013.01);
(Continued)

(58) Field of Classification Search
CPC .. G06F 3/0484; G06F 3/0482; G06F 3/04817; G06F 3/04847; A61H 33/005;
(Continued)

(56) References Cited

U.S. PATENT DOCUMENTS

| 4,568,821 A | 2/1986 | Boe |
| 5,361,215 A | 11/1994 | Tompkins et al. |

(Continued)

FOREIGN PATENT DOCUMENTS

| CA | 2324598 | 4/2001 |
| CA | 2349106 | 11/2001 |

(Continued)

OTHER PUBLICATIONS

Examiner's Report dated May 3, 2021 in connection with Canadian Patent Application No. 3,007,688—10 pages.
(Continued)

*Primary Examiner* — Ronald D Hartman, Jr.

(57) ABSTRACT

A method, device and system for displaying, via a user interface, an ambiance setting for a bathing system. The user interface is configured to display at least one display page on a display screen. The method comprises displaying on the display screen, a plurality of ambiance settings selectable by a user of the user interface, receiving, at a processor, an indication of a selected ambiance setting from the plurality of ambiance settings displayed on the display screen and in response to the selected ambiance setting, displaying on the display screen a first operational setting for at least one first type of bathing unit component and a second operational setting for at least one second type of bathing unit component. The first operational setting and the second operational setting are pre-programmed in association with the selected ambiance setting.

26 Claims, 11 Drawing Sheets

Related U.S. Application Data continuation of application No. 15/227,404, filed on Aug. 3, 2016, now Pat. No. 10,235,033, which is a continuation of application No. 14/106,554, filed on Dec. 13, 2013, now Pat. No. 9,442,639, which is a continuation of application No. 12/910,615, filed on Oct. 22, 2010, now Pat. No. 8,644,960.

(51) Int. Cl.
  *A61H 33/02* (2006.01)
  *G06F 1/16* (2006.01)
  *G06F 3/0484* (2022.01)
  *G06F 3/04817* (2022.01)
  *G06F 3/0482* (2013.01)

(52) U.S. Cl.
  CPC ............ *A61H 33/02* (2013.01); *A61H 33/60* (2013.01); *G06F 1/1626* (2013.01); *G06F 3/0482* (2013.01); *G06F 3/0484* (2013.01); *G06F 3/04817* (2013.01); *A61H 33/601* (2013.01); *A61H 33/6068* (2013.01); *A61H 2033/0079* (2013.01); *A61H 2033/0083* (2013.01); *A61H 2201/5007* (2013.01); *A61H 2201/5012* (2013.01); *A61H 2201/5046* (2013.01); *A61H 2201/5097* (2013.01)

(58) Field of Classification Search
  CPC .... A61H 2201/5007; A61H 2201/5012; A61H 2201/5097
  See application file for complete search history.

(56) References Cited

U.S. PATENT DOCUMENTS

| | | |
|---|---|---|
| 5,710,409 A | 1/1998 | Schwarzbacker et al. |
| 5,930,852 A | 8/1999 | Gravatt et al. |
| 6,166,729 A | 12/2000 | Acosta et al. |
| 6,200,108 B1 | 3/2001 | Caudill et al. |
| 6,355,913 B1 | 3/2002 | Authier et al. |
| 6,476,363 B1 | 11/2002 | Authier et al. |
| 6,488,408 B1 | 12/2002 | Laflamme et al. |
| 6,676,831 B2 | 1/2004 | Wolfe |
| 6,714,977 B1 | 3/2004 | Fowler et al. |
| 6,717,050 B2 | 4/2004 | Laflamme et al. |
| 6,734,879 B2 | 5/2004 | Hasha et al. |
| 6,744,223 B2 | 6/2004 | Laflamme et al. |
| 6,754,321 B1 | 6/2004 | Innes et al. |
| 6,775,374 B2 | 8/2004 | Nishikawa |
| 6,782,309 B2 | 8/2004 | Laflamme et al. |
| 6,813,575 B2 | 11/2004 | Laflamme |
| 6,874,175 B2 | 4/2005 | Laflamme et al. |
| 6,900,736 B2 | 5/2005 | Crumb |
| 6,929,516 B2 | 8/2005 | Brochu et al. |
| 6,942,354 B2 | 9/2005 | Metayer et al. |
| 7,010,363 B2 | 3/2006 | Donnelly et al. |
| 7,046,163 B2 | 5/2006 | Macey |
| 7,112,768 B2 | 9/2006 | Brochu et al. |
| 7,292,898 B2 | 11/2007 | Clark et al. |
| 7,327,275 B2 | 2/2008 | Brochu et al. |
| 7,398,138 B2 | 7/2008 | Emery et al. |
| 7,419,406 B2 | 9/2008 | Brochu et al. |
| 7,420,293 B2 | 9/2008 | Donnelly et al. |
| 7,440,820 B2 | 10/2008 | Gougerot et al. |
| 7,489,986 B1 | 2/2009 | Laflamme et al. |
| 7,514,884 B2 | 4/2009 | Potucek et al. |
| 7,593,789 B2 | 9/2009 | Gougerot et al. |
| 7,619,181 B2 | 11/2009 | Authier |
| 7,701,679 B2 | 4/2010 | Brochu et al. |
| 7,843,357 B2 | 11/2010 | Brochu et al. |
| 7,982,625 B2 | 7/2011 | Brochu et al. |
| 8,104,110 B2 * | 1/2012 | Caudill ............... F04D 15/0066 4/541.1 |
| 8,150,552 B2 | 4/2012 | Brochu et al. |
| 8,164,470 B2 | 4/2012 | Brochu et al. |
| 8,612,061 B2 | 12/2013 | Laflamme et al. |
| 8,644,960 B2 | 2/2014 | Laflamme et al. |
| 8,892,261 B2 | 11/2014 | Hoonhout et al. |
| 9,043,472 B1 | 5/2015 | Chau |
| 9,405,441 B2 | 8/2016 | Trafton et al. |
| 9,442,639 B2 | 9/2016 | Laflamme et al. |
| 10,037,675 B2 | 7/2018 | Uy |
| 10,159,624 B2 | 12/2018 | Laflamme et al. |
| 10,235,033 B2 | 3/2019 | Laflamme et al. |
| 10,624,812 B2 | 4/2020 | Laflamme et al. |
| 10,789,335 B2 | 9/2020 | Kang et al. |
| 10,809,905 B2 | 10/2020 | Laflamme et al. |
| 11,116,692 B2 | 9/2021 | Laflamme |
| 11,213,455 B2 | 1/2022 | Laflamme et al. |
| 2001/0029407 A1 | 10/2001 | Tompkins et al. |
| 2002/0025050 A1 * | 2/2002 | Macey ............... H04H 20/61 381/87 |
| 2002/0070875 A1 * | 6/2002 | Crumb ............... G08C 19/24 340/12.5 |
| 2002/0175828 A1 * | 11/2002 | Macey ............... A61H 33/005 340/12.5 |
| 2003/0011634 A1 | 1/2003 | Hasha et al. |
| 2003/0020742 A1 | 1/2003 | Hasha et al. |
| 2003/0022635 A1 | 1/2003 | Benning et al. |
| 2003/0121094 A1 | 7/2003 | Laflamme et al. |
| 2004/0054789 A1 | 3/2004 | Breh et al. |
| 2004/0117330 A1 | 6/2004 | Ehlers et al. |
| 2004/0119814 A1 | 6/2004 | Clisham et al. |
| 2004/0244103 A1 * | 12/2004 | Laflamme ............... A61H 33/60 4/541.1 |
| 2005/0015458 A1 | 1/2005 | La |
| 2005/0045621 A1 | 3/2005 | Chenier et al. |
| 2005/0088119 A1 * | 4/2005 | Potucek ............... H05B 47/155 315/312 |
| 2005/0167345 A1 * | 8/2005 | De Wet ............... C02F 1/008 210/85 |
| 2005/0222786 A1 * | 10/2005 | Tarpo ............... A61H 33/60 702/65 |
| 2005/0222933 A1 | 10/2005 | Wesby |
| 2005/0288821 A1 * | 12/2005 | Laflamme ............... A61H 33/0087 700/275 |
| 2006/0031476 A1 | 2/2006 | Mathes et al. |
| 2006/0092008 A1 | 5/2006 | Corrington et al. |
| 2006/0221841 A1 | 10/2006 | Lee et al. |
| 2007/0106403 A1 | 5/2007 | Emery et al. |
| 2008/0021685 A1 | 1/2008 | Emery et al. |
| 2008/0039977 A1 | 2/2008 | Clark et al. |
| 2008/0129578 A1 * | 6/2008 | Petersen ............... E04H 4/14 341/176 |
| 2008/0154394 A1 | 6/2008 | Lin |
| 2008/0163416 A1 | 7/2008 | Go |
| 2008/0168599 A1 | 7/2008 | Caudill et al. |
| 2008/0205865 A1 | 8/2008 | Lesage et al. |
| 2008/0259056 A1 | 10/2008 | Freier et al. |
| 2008/0311898 A1 | 12/2008 | Benco et al. |
| 2009/0013210 A1 | 1/2009 | McIntosh et al. |
| 2009/0106890 A1 * | 4/2009 | Rosenau ............... A61H 33/005 4/580 |
| 2009/0164049 A1 | 6/2009 | Nibler et al. |
| 2009/0187499 A1 | 7/2009 | Mulder et al. |
| 2009/0200245 A1 * | 8/2009 | Steinbrueck ............ C02F 1/008 210/741 |
| 2009/0204263 A1 * | 8/2009 | Love ............... G05D 23/19 700/282 |
| 2009/0218296 A1 | 9/2009 | King et al. |
| 2009/0240766 A1 | 9/2009 | Kikkawa et al. |
| 2009/0255049 A1 | 10/2009 | Rosenau |
| 2010/0132106 A1 | 6/2010 | Cline et al. |
| 2010/0138786 A1 | 6/2010 | McQueen |
| 2010/0150170 A1 | 6/2010 | Lee et al. |
| 2010/0168878 A1 | 7/2010 | Hoonhout et al. |
| 2010/0206869 A1 | 8/2010 | Nelson et al. |
| 2010/0219962 A1 | 9/2010 | Brochu et al. |
| 2011/0006904 A1 | 1/2011 | Duchamp et al. |
| 2011/0023225 A1 | 2/2011 | Kaykov et al. |
| 2011/0030016 A1 | 2/2011 | Pino et al. |
| 2011/0046805 A1 | 2/2011 | Bedros et al. |

(56) References Cited

U.S. PATENT DOCUMENTS

| | | | |
|---|---|---|---|
| 2011/0046806 | A1 | 2/2011 | Nagel et al. |
| 2011/0093099 | A1 | 4/2011 | Tran et al. |
| 2011/0098869 | A1 | 4/2011 | Seo et al. |
| 2011/0202150 | A1 | 8/2011 | Tran et al. |
| 2012/0055419 | A1 | 3/2012 | Beyerle et al. |
| 2012/0078426 | A1 | 3/2012 | Macey |
| 2012/0096637 | A1 | 4/2012 | Laflamme et al. |
| 2012/0158336 | A1 | 6/2012 | Duchamp et al. |
| 2012/0173382 | A1 | 7/2012 | Loveland |
| 2013/0094444 | A1 | 4/2013 | Lai et al. |
| 2014/0108986 | A1 | 4/2014 | Laflamme et al. |
| 2015/0095402 | A1 | 4/2015 | Fraccaroli |
| 2015/0335523 | A1 | 11/2015 | Kang et al. |
| 2016/0342323 | A1 | 11/2016 | Laflamme et al. |
| 2017/0100656 | A1 | 4/2017 | Laflamme et al. |
| 2017/0203634 | A1 | 7/2017 | Dickow |
| 2017/0209339 | A1 | 7/2017 | Potucek et al. |
| 2017/0267547 | A1 | 9/2017 | Miller et al. |
| 2019/0155494 | A1 | 5/2019 | Laflamme et al. |
| 2019/0242813 | A1 | 8/2019 | Stahlman |
| 2019/0374431 | A1 | 12/2019 | Laflamme et al. |
| 2020/0188227 | A1 | 6/2020 | Laflamme et al. |
| 2021/0369561 | A1 | 12/2021 | Laflamme |

FOREIGN PATENT DOCUMENTS

| | | |
|---|---|---|
| CA | 2357641 | 3/2002 |
| CA | 2361096 | 5/2002 |
| CA | 2412221 | 5/2003 |
| CA | 2442861 | 9/2004 |
| CA | 2430862 | 12/2004 |
| CA | 2467015 | 3/2005 |
| CA | 2483876 | 4/2005 |
| CA | 2492350 | 8/2005 |
| CA | 2521572 | 5/2006 |
| CA | 2499551 | 9/2006 |
| CA | 2730873 | 8/2011 |
| CA | 2762788 | 6/2013 |
| CA | 2755672 | 4/2016 |
| CA | 2755673 | 6/2017 |
| CA | 2934395 | 11/2017 |
| CA | 2904274 | 12/2017 |
| WO | 2017127802 | 7/2017 |

OTHER PUBLICATIONS

Notice of Allowance dated May 27, 2021 in connection with U.S. Appl. No. 16/002,956—30 pages.
Final Office Action dated Jan. 1, 2021 in connection with U.S. Appl. No. 16/002,956—19 pages.
Examiner's Report dated Jan. 18, 2021 in connection with Canadian Patent Application No. 3,063,474—5 pages.
Notice of Allowance dated Sep. 16, 2020 in connection with U.S. Appl. No. 16/260,555—6 pages.
Examiner's Report dated Sep. 16, 2020 in connexion with Canadian Patent Application No. 3,007,688—5 pages.
Non-Final Office Action dated Oct. 26, 2012 in connection with U.S. Appl. No. 12/910,615, 13 pages.
Non-Final Office Action dated Mar. 22, 2013 in connection with U.S. Appl. No. 12/916,160, 16 pages.
Notice of Allowance dated Aug. 16, 2013 in connection with U.S. Appl. No. 13/916,160, 13 pages.
Restriction Requirement dated Sep. 30, 2013 in connection with U.S. Appl. No. 13/336,513, 5 pages.
Non-Final Office Action dated Nov. 7, 2013 in connection with U.S. Appl. No. 13/336,513, 20 pages.
Non-Final Office Action dated Mar. 11, 2014 in connection with U.S. Appl. No. 14/106,554, 59 pages.
Notice of Allowance dated Sep. 25, 2013 in connection with U.S. Appl. No. 12/910,615, 23 pages.
Final Office Action dated Jun. 26, 2014 in connection with U.S. Appl. No. 13/336,513, 8 pages.
Restriction Requirement dated Nov. 4, 2014 in connection with U.S. Appl. No. 14/106,554, 13 pages.
Non-Final Office Action dated Jan. 23, 2015 in connection with U.S. Appl. No. 13/336,513, 7 pages.
Examiner's Report dated Feb. 10, 2015 in connection with Canadian patent application 2,755,672, 6 pages.
Ex-Parte Quayle Action dated Apr. 22, 2015 in connection with U.S. Appl. No. 14/106,554, 4 pages.
Final Office Action dated Jul. 14, 2015 in connection with U.S. Appl. No. 13/336,513, 9 pages.
Notice of Allowance dated Sep. 17, 2015 in connection with Canadian patent application 2,755,672, 1 page.
Non-Final Office Action dated Nov. 4, 2015 in connection with U.S. Appl. No. 14/106,554, 11 pages.
Non-Final Office Action dated Dec. 14, 2015 in connection with U.S. Appl. No. 14/852,792, 8 pages.
Examiner's Report dated May 10, 2016 in connection with Canadian patent application 2,755,673, 2 pages.
Final Office Action dated May 5, 2016 in connection with U.S. Appl. No. 14/852,792, 6 pages.
Notice of Allowance dated May 6, 2016 in connection with U.S. Appl. No. 14/106,554, 5 pages.
Newport Controls, LLC, "Azure Control Panel User's Manuel", downloaded from the internet website www.newportcontrols.com on Sep. 27, 2010, Revision Date: Apr. 23, 2010, 37 pages.
Non-Final Office Action dated Dec. 2, 2016 in connection with related U.S. Appl. No. 14/852,792, 7 pages.
Examiner's Report dated Jan. 24, 2017 in connection with Canadian application No. 2,904,274—3 pages.
Examiner's Report dated Jan. 24, 2017 in connection with Canadian application No. 2,762,788—3 pages.
Final Office Action dated Mar. 27, 2017 in connection with related U.S. Appl. No. 14/852,792—10 pages.
Notice of Allowance dated Apr. 12, 2017 in connection with Canadian application No. 2,934,395—1 page.
Notice of Allowance dated Jun. 29, 2017 in conenction with Canana application No. 2,904,274—1 page.
Non Final Office Action dated Aug. 30, 2017 in connection with U.S. Appl. No. 14/852,792—13 pages.
Examiner's Report dated Oct. 12, 2017 in connection with Canadian Patent Application No. 2,762,788—5 pages.
Restriction Requirement dated Nov. 7, 2017 in connection with U.S. Appl. No. 15/227,404—6 pages.
Office Action dated Jan. 10, 2018 in connection with U.S. Appl. No. 15/227,404—6 pages.
Restriction Requirement dated Jan. 12, 2018 in connection with U.S. Appl. No. 14/851,986—8 pages.
Notice of Allowance dated Aug. 14, 2018 in connectin with U.S. Appl. No. 14/851,986—12 pages.
Corrected Notice of Allowance dated Sep. 12, 2018 in connectin with U.S. Appl. No. 14/851,986—2 pages.
Examiner's Report dated Sep. 28, 2018 in connection with Canadian Patent Application No. 2,762,788—5 pages.
Examiner's Report dated Nov. 13, 2018 in connection with Canadian Patent Application No. 2,982,143—3 pages.
Notice of Allowance dated Nov. 15, 2018 in connection with U.S. Appl. No. 15/227,404 —9 pages.
Non-Final Office Action dated Jul. 17, 2019 in connection with U.S. Appl. No. 15/916,041—8 pages.
Examiner's Report dated Aug. 28, 2019 in connection with CA Patent Application No. 2,982,143—3 pages.
Examiner's Report dated Sep. 5, 2019 in connection with Canadian Patent Application No. 3,007,688—7 pages.
Examiner's Report dated Oct. 4, 2019 in connection with Canadian patent Application No. 2,762,788—6 pages.
Notice of Allowance dated Dec. 2, 2019 in connection with U.S. Appl. No. 15/916,041—4 pages.
Non-Final Office Action dated Feb. 6, 2020 in connection with U.S. Appl. No. 16/260,555—8 pages.
Notice of Allowance dated Jun. 24, 2020 in connection with U.S. Appl. No. 16/260,555—8 pages.
Non-Final office Action dated Jun. 24, 2020 in connexion with U.S. Appl. No. 16/002,956—16 pages.

(56) References Cited

OTHER PUBLICATIONS

Notice of Allowance dated Jul. 27, 2020 in connection with Canadian application No. 3,007,688—1 page.
Corrected Notice of Allowance dated Nov. 17, 2021 in connection with U.S. Appl. No. 16/803,340—13 pages.
Non-Final Office Action dated Jul. 28, 2021 in connection with U.S. Appl. No. 16/803,340—7 pages.
Examiner's Report dated Sep. 20, 2021 in connection with Canadian Patent Application No. 3,063,474—6 pages.
Notice of Allowance dated Oct. 6, 2021 in connection with U.S. Appl. No. 16/803,340—8 pages.
Jacuzzi, "Explore the Jacuzzi ProLink App", https://www.youtube.com/watch?v=fiW-DfNAJzM, Sep. 8, 2015 (Aug. 9, 2015).

\* cited by examiner

METHOD AND SYSTEM FOR MONITORING AND CONTROLLING OPERATIONAL SETTINGS IN A BATHING SYSTEM

CROSS-REFERENCE TO RELATED APPLICATIONS

The present application is a continuation under 35 USC § 120 of co-pending U.S. patent application Ser. No. 16/260,555, filed on Jan. 29, 2019, which itself was a continuation under 35 USC § 120 of U.S. patent application Ser. No. 15/227,404 filed on Aug. 3, 2016, which issued as U.S. Pat. No. 10,235,033 on Mar. 19, 2019, which itself was a continuation under 35 USC § 120 of U.S. patent application Ser. No. 14/106,554 filed on Dec. 13, 2013, which issued as U.S. Pat. No. 9,442,639 on Sep. 13, 2016 and which itself was a continuation under 35 USC § 120 of U.S. patent application Ser. No. 12/910,615 filed Oct. 22, 2010, which issued as U.S. Pat. No. 8,644,960 on Feb. 4, 2014. The contents of the aforementioned documents are incorporated herein by reference.

FIELD OF THE INVENTION

The present invention relates generally to the field of control systems for bathing unit systems, and more specifically, to a control system and user control interface suitable for facilitating the selection and programming of ambiance settings for the bathing unit system.

BACKGROUND

Bathing units, such as spas, typically include various bathing unit components that are used in operating the bathing unit system. The bathing unit components generally include pumps that circulate water through a piping system, pumps for activating water jets, at least one heating module to heat the water, a filter system, an air blower, an ozone generator, a lighting system, and a control system that activate and manage the various operational settings of the bathing unit components. Other types of bathing units that have similar components include, for instance, whirlpools, hot tubs, bathtubs, therapeutic baths, and swimming pools. In addition to bathing unit components used for regulating the operation of the bathing unit system, additional components that provide added entertainment are increasingly being included as part of bathing unit systems. An example of such a feature includes lighting elements for providing visual stimulation to users of the bathing unit system. An example of a lighting element using multicolor LEDs was described in U.S. Pat. No. 6,744,223 entitled "Multicolor lamp system" issued on Jun. 1, 2004 to B. Laflamme et al. The contents of the above document are incorporated herein by reference. Other features include multimedia elements providing audio and/or video functionality. Examples of audio systems for spas have been described in U.S. patent publication no.: US 2002/0025050 A1, entitled "Spa Audio System Operable With A Remote Control" filed on May 24, 2001 by S. S. Macey; in U.S. patent publication no.: 2004/0047484 A1, entitled "Soundystem, a speaker assembly, and a method for providing sound for a spa" filed on Sep. 5, 2003 by W. J. Gardenier et al. and U.S. patent publication no.: 2010/0070059 A1, entitled "Bathing unit control system providing multimedia functionality, telephone functionality and/or data network access functionality and bathing unit system including same" filed on Nov. 16, 2009 by B. Laflamme et al., The contents of the above noted documents are incorporated herein by reference.

Most modern bathing unit systems include a user control interface that is in communication with the bathing unit control system. A user of the bathing unit system is able to interact with the user control interface in order to adjust and control the activation and settings of the various bathing unit components. It is known in the art to have a user control interface that provides the user with a display screen and buttons for allowing a user to control the functionality of the various bathing unit components.

Traditionally, each operational parameter of a bathing unit is independently set by a user in order to achieve a desired total effect in the bathing unit system. For example, if the user wishes to achieve a relaxed ambiance in the bathing unit, he/she may select low lighting, spa jets at a medium speed, calming music at a low volume and to have the filtration system turned off. Each of the parameters is set independently by the user who must choose an operational setting for these parameters using the controls provided on a control interface. This can be a time-consuming and frustrating activity for the user.

As such, a deficiency with existing control systems and user control interfaces is that they do not provide suitable functionality for allowing the user of the bathing unit system to adjust and activate the desired operational settings for the bathing unit components in a relatively quick and convenient manner. In most cases, when the bathing unit system is turned on, at least some of the bathing unit components will be activated in accordance with a "start-up" procedure. However, if the user then wants to change the operational settings of the bathing unit components, such as increase the heat, deactivate some of the pumps, adjust the jet pressure, etc. . . . each one of these adjustments needs to be done independently. This results in both a time-consuming and inconvenient procedure for the user of the bathing unit system.

As such, there remain deficiencies in existing control systems and user control interfaces. One deficiency with existing systems is that they do not provide a suitable interface for allowing a user to quickly and easily view the operational settings for multiple different types of bathing unit components at the same time, nor do they provide a user with the ability to quickly and easily adjust the operational settings that have been stored in a memory unit of the bathing system.

Against the background described above, it is clear that there remains a need in the industry to provide a control system and associated user control interface that alleviates at least in part the problems associated with existing control systems and user control interfaces.

SUMMARY

In accordance with a broad aspect, the invention provides a method for displaying, via a user interface, a ambiance setting for a bathing system. The user interface is configured to display at least one display page on a display screen. The method comprises displaying on the display screen, a plurality of ambiance settings selectable by a user of the user interface, receiving, at a processor, an indication of a selected ambiance setting from the plurality of ambiance settings displayed on the display screen and in response to the selected ambiance setting, displaying on the display screen a first operational setting for at least one first type of bathing unit component and a second operational setting for at least one second type of bathing unit component. The first operational setting and the second operational setting are pre-programmed in association with the selected ambiance setting.

In accordance with a broad aspect, the invention provides a device for use in connection with a bathing system. The bathing system comprises a first type of bathing unit component and a second type of bathing unit component. The device comprises a display screen for displaying a graphical user interface and a processor in communication with the display screen. The processor is programmed for displaying on the display screen, a plurality of ambiance settings selectable by a user of the user interface, receiving, at a processor, an indication of a selected ambiance setting from the plurality of ambiance settings displayed on the display screen and in response to the selected ambiance setting, displaying on the display screen a first operational setting for at least one first type of bathing unit component and a second operational setting for at least one second type of bathing unit component. The first operational setting and the second operational setting are pre-programmed in association with the selected ambiance setting.

In accordance with another broad aspect, the invention provides a bathing system that comprises a first type of bathing unit component and a second type of bathing unit component, a bathing unit controller for issuing signals for controlling the first type of bathing unit component and the second type of bathing unit component and a user control interface in communication with the bathing unit controller. The user control interface is configured to present at least one display page on a display screen. The user control interface is operating for displaying on the display screen a plurality of ambiance settings selectable by a user and in response to a selected ambiance setting, displaying on the display screen a first operational setting for at least one of the first type of bathing unit component and a second operational setting for at least one of the second type of bathing unit component. The first operational setting and the second operational setting are pre-programmed in association with the selected ambiance setting.

In accordance with another broad aspect, the invention provides a method for configuring a graphical user interface for a bathing system that comprises a set of bathing unit components. The graphical user interface is configured to present sequentially a first display page and a second display page on a display screen. The method comprising causing the graphical user interface to display on the first display page, a plurality of ambiance settings selectable by a user, receiving, at a processor, an indication of a selected ambiance setting from the plurality of ambiance settings displayed on the first display page and in response to the selected ambiance setting, causing the graphical user interface to display on the second display page, an operational setting for at least one bathing unit component in the set of bathing unit components, the operational setting being associated with the selected ambiance setting. Wherein a display setting of the second display page is configured at least in part on a basis of the selected ambiance setting.

In accordance with another broad aspect, the invention provides a device for use in connection with a bathing system. The bathing system comprises a set of bathing unit components. The device comprises a display screen for displaying sequentially a first display page and a second display page and a processor in communication with the display screen. The processor being programmed for displaying on the first display page a plurality of ambiance settings selectable by a user of the device, receiving an indication of a selected ambiance setting from the plurality of ambiance settings displayed on the first display page and in response to the selected ambiance setting, displaying on the second display page, an operational setting for at least one bathing unit component of the set of bathing unit components, the operational setting being associated with the selected ambiance setting, wherein a display setting of the second display page is configured at least in part on a basis of the selected ambiance setting.

In accordance with another broad aspect, the invention provides a bathing system, comprising a set of bathing unit components, a bathing unit controller for issuing signals for controlling the set of bathing unit components and a user control interface in communication with the bathing unit controller. The user control interface is configured to present sequentially a first display page and a second display page. The user control interface is operating for displaying on the first display page, a plurality of ambiance settings selectable by a user and in response to the selected ambiance setting, displaying on the second display page, an operational setting for at least one bathing unit component in the set of bathing unit components, the operational setting being associated with the selected ambiance setting. Wherein a display setting of the second display page is configured at least in part on a basis of the selected ambiance setting.

In accordance with another broad aspect, the invention provides a graphical user interface implemented on a computing device for recording functional settings associated with a user-defined ambiance setting. The graphical user interface comprises on a display page, a first input area for receiving from the user of the computing device a desired operational setting for a first bathing unit component type, on the display page, a second input area for receiving from the user of the computing device a desired operational setting for a second bathing unit component type and on the display page, a third input area for receiving from the user of the computing device an indication that the desired operational setting for the first bathing unit component type and the desired operational setting for the second bathing unit component type should be recorded in association with the user-defined ambiance setting.

In accordance with another broad aspect, the invention provides a graphical user interface implemented on a computing device for displaying to a user at least one operational setting for a bathing unit component of a bathing system. The graphical user interface comprising a first information area for identifying a ambiance setting stored in a computer-readable medium, a second information area providing a pictorial representation of the bathing unit component and a first input area for allowing the user of the computing device to enter a desired adjustment to a pre-programmed operational setting for the bathing unit component that is associated with the ambiance setting. These and other aspects and features of the present invention will now become apparent to those of ordinary skill in the art upon review of the following description of specific embodiments of the invention in conjunction with the accompanying drawings.

BRIEF DESCRIPTION OF THE DRA WINGS

A detailed description of the embodiments of the present invention is provided herein below, by way of example only, with reference to the accompanying drawings, in which.

Figure 1:
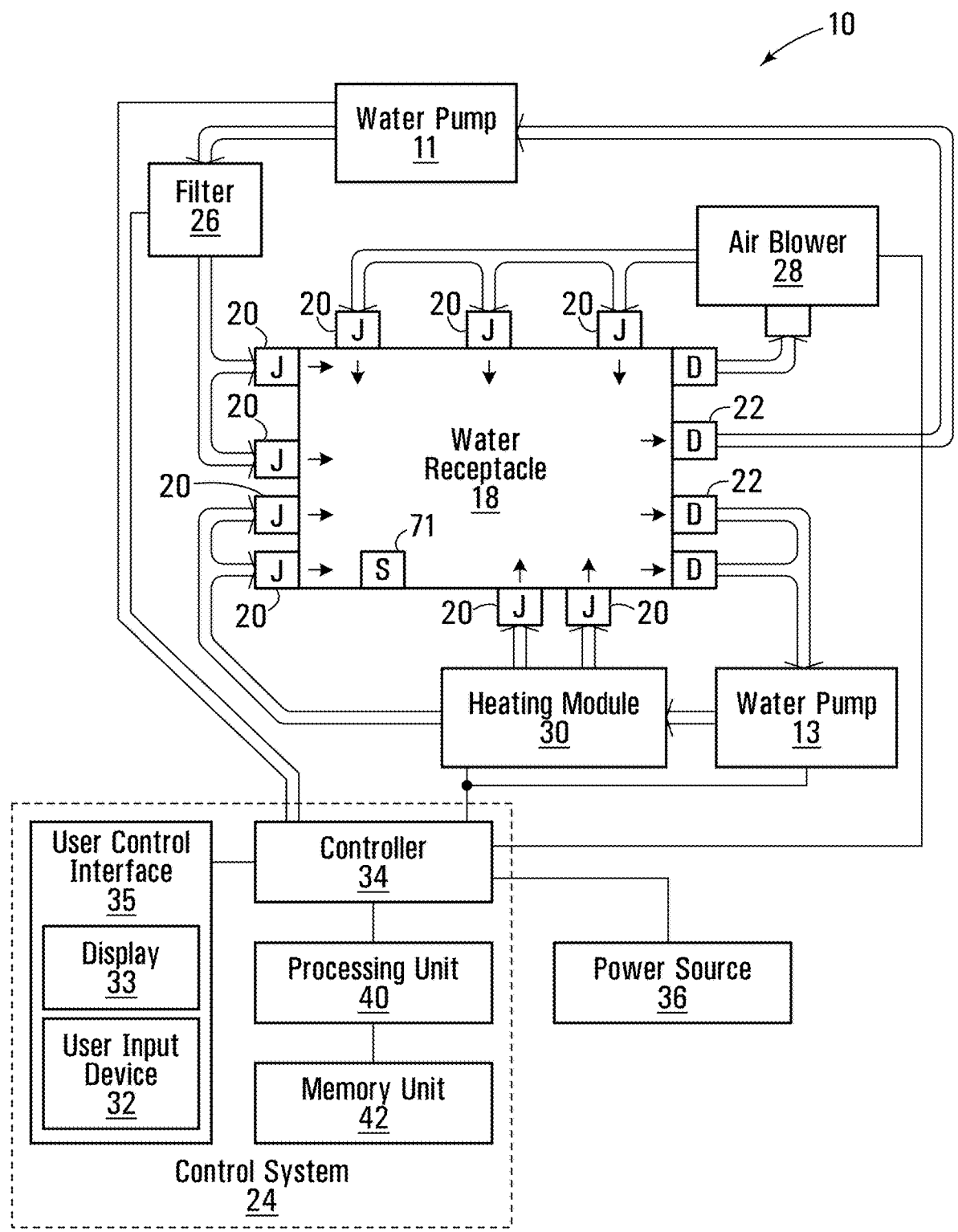
FIG. 1 shows a block diagram of a bathing unit system equipped with a bathing unit control system in accordance with a first non-limiting example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a bathing unit system. It is to be understood that the term "bathing unit system", as used for the purposes of the present description, refers to spas, whirlpools, hot tubs, bathtubs, therapeutic baths, swimming pools and any other type of bathing unit that can be equipped with a control system and associated user control interface for controlling various operational settings of the bathing units.

FIG. 1 illustrates a block diagram of a bathing unit system 10 in accordance with a non-limiting example of implementation of the present invention. The bathing unit system 10 includes a water receptacle 18 for holding water, a plurality of jets 20, a set of drains 22 and a control system 24. In the specific embodiment shown in FIG. 1, the bathing unit system 10 further includes a set of bathing unit components comprising a heating module 30, two water pumps 11 and 13, a filter 26 and an air blower 28. It should be understood that the bathing unit system 10 could include more or less bathing unit components without departing from the spirit of the invention. For example, although not shown in FIG. 1, the bathing unit system 10 could include an ozonator, a lighting system for lighting up the water in the receptacle 18, multimedia devices such as an MP3 player, a CD/DVD player as well as any other suitable device.

In the non-limiting embodiment shown, the control system 24 includes a controller 34 for controlling the set of bathing unit components 11, 13, 26, 28, 30 and a user control interface 35 for enabling a user to enter user commands to the controller 34. In the embodiment shown, the user control interface 35 comprises a display screen 33 and a user input device 32 (which can also be referred to as a user operable input). The user input device 32 could include a trackball, mouse, gyroscope remote (which senses movement of the device in the air so as to move a cursor), a keypad, a touch sensitive screen, turn-dials, turn-and-push dials (such as idrive from BMW), a stylus pen or a microphone, among other possibilities. The user input device 32 can include one or a combination of any or all of the above input devices.

The user control interface 35 provides an interface that allows a user to enter commands for causing the controller 34 to control the various operational settings of the bathing unit components 11, 13, 26, 28, 30. Some non-limiting examples of operational settings include temperature control settings, jet control settings, and lighting settings, among other possibilities. In a non-limiting embodiment where the bathing unit is connected to entertainment and/or multimedia modules, the operational settings of the bathing unit may also include audio settings and video settings, amongst others. Consequently, the expression "operational settings", for the purpose of the present invention, is intended to cover operational settings for any suitable bathing unit component or components that can be operated by a user of the bathing unit system.

The control system 24 receives electrical power from an electric power source 36 that is connected to the controller 34 via service wiring 31. The power source 36 supplies the controller 34 with any conventional power service suitable for residential or commercial use. The controller 34 then controls the distribution of power supplied to the various bathing unit components 11, 13, 26, 28, 30 on the basis of program instructions and signals received from the user control interface 35 in order to cause the desired operational settings to be implemented. The controller 34 may also receive control signals from various sensors 71 in order to cause the desired operational settings to be implemented. Manners in which the controller 34 can be used to control the individual bathing unit components of the bathing unit system, such as for example the jets 20, the drains 22, the heating module 30, the water pumps 11 and 13, the filter 26, the air blower 24, a valve jet sequencer for massage, a variable speed pump with a pre-programmed massage setting, a water fall, an aromatherapy device and an atomizer, as well as any lighting and multimedia components, are well known in the art and are not critical to the invention and as such will not be described in further detail here.

In a non-limiting implementation, the power source 36 can supply 240 volts (V) AC to the controller 34 via service wiring 31. In an alternative non-limiting implementation, the power source 36 can supply 120 volts (V) AC to the controller 34 via service wiring 31. In yet a further alternative non-limiting implementation, the power source 36 can supply 120 Volts and 240 Volts AC to the controller 34 via service wiring 31. It is to be appreciated that other voltage supply values or voltage supply combinations, for example depending on geographical location, are possible without detracting from the spirit and scope of the invention. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

In normal operation, water flows from the bathing unit receptacle 18, through the drains 22 and is pumped by water pump 13 through the heating module 30 where the water is heated. The heated water then leaves the heating module 30 and re-enters the bathing unit receptacle 18 through jets 20. In addition, water flows from the bathing unit receptacle 18, through different drains 22 and is pumped by water pump 11 through filter 26. The filtered water then re-enters the bathing unit receptacle 18 through different jets 20. Water can flow through these two cycles continuously while the bathing unit system 10 is in operation. Optionally, water can also flow from the bathing unit receptacle 18 through one or more drains 22 to an air blower 28 that is operative for delivering air bubbles to water that re-enters the bathing unit receptacle 18 through jets 20.

As shown in FIG. 1, the controller 34 includes a processing unit 40 and a memory unit 42 that are in communication with one another over a communication bus. The processing unit is operative for accessing and processing program instructions stored within the memory unit 42 for enabling the controller 34 to control the set of bathing unit components 11, 13, 26, 28 and 30 at least in part on the basis of those program instructions and/or inputs received from a user via the user control interface 35.

The User Control Interface 35

The user control interface 35 according to the present invention provides an interface for allowing a user of the bathing unit system to provide commands or other information to the bathing unit controller 34 of the control system 24. The control interface 35 communicates with the bathing unit components by sending signals through the bathing unit controller 34. Similarly, the control interface 35 receives incoming signals from the bathing unit controller 34, which can include signals conveying operational settings of the bathing unit. As such, via the user control interface 35, a user is able to enter commands that can be implemented by the controller 34 for controlling the activation and operational settings of the various bathing unit components.

As described above, the user control interface 35 comprises a user input device 32 (which can also be referred to as user operable controls) and a display screen 33. The display screen 33 is operative for displaying a graphical user interface (GUI) to a user that provides the user with information regarding the bathing unit system and enables the user to input commands for controlling various bathing unit components of the bathing unit system. In accordance with a non-limiting example that will be described in more detail below, the GUI comprises a plurality of display screens that can be navigated by a user of the GUI via the user input device 32 in order to access desired information and provide desired inputs for adjusting and activating the operational settings of the bathing unit components.

In accordance with a first non-limiting example of implementation, and as shown in FIG. 1, the user control interface 35 in accordance with the present invention can be included within the control system 24 of the bathing unit system 10. In such an embodiment, the user control interface 35 may be in communication with the controller 34 via a wire line data bus 29. In addition, the user control interface 35 is in communication with the processing unit 40 and the memory unit 42 of the control system 24. It is the processing unit 40 that accesses and processes program instructions stored within the memory unit 42 for enabling the user control interface 35 to implement the graphical user interface and process the input commands received from the user via the user input device 32 of the user control interface 32. It should be appreciated that in an alternative non-limiting embodiment, the user control interface 35 may comprise a separate processing unit and memory unit that are dedicated to the functionality of the user control interface.

Figure 2:
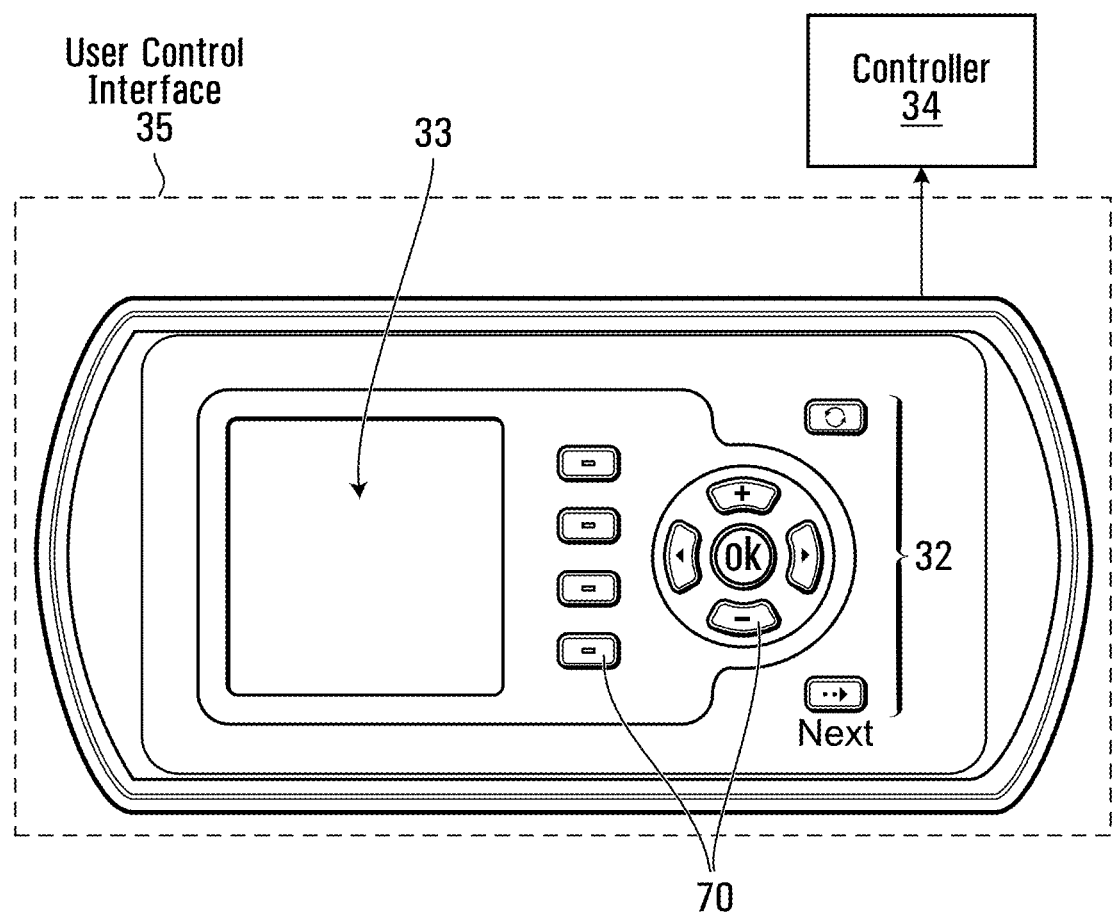
FIG. 2 shows a physical representation of the user control interface of FIG. 1 in accordance with a non-limiting example of implementation of the present invention.

Shown in FIG. 2 is a non-limiting physical representation of the user control interface 35 of FIG. 1 that comprises a display screen 33 and a user input device 32. In the embodiment shown, the user input device 32 comprises a plurality of buttons 70 that can be pressed by a user in order to scroll through and select options offered by the graphical user interface displayed on the display screen 32. Although the user input devices 32 shown in FIG. 2 comprises a plurality of buttons 70, it should be appreciated that any other type, or combination, of user input devices known in the art could be used, including a pointing device, trackball, mouse, gyroscope remote (which senses movement of the device in the air so as to move a cursor), a keypad, a touch sensitive screen, turn-dials, turn-and-push dials (such as idrive from BMW), a stylus pen or a microphone, among other possibilities.

The user control interface 35 is suitable to be located on the top-side of a bathing unit receptacle so that it can be accessed by a user positioned in the bathing unit receptacle, on an exterior panel of the bathing unit receptacle or in a location remote from the bathing unit receptacle. When the user control interface 35 is located remotely from the bathing unit receptacle, it may be mounted on a wall (for example in or outside a house) or it may be integrated in a free standing structure that can be positioned on a surface in proximity to the bathing unit receptacle. The user control interface 35 shown in FIG. 1 may be in communication with the bathing unit controller 30 over a wireless link (such as an RF or infrared link) or a wired communication link.

Figure 3:
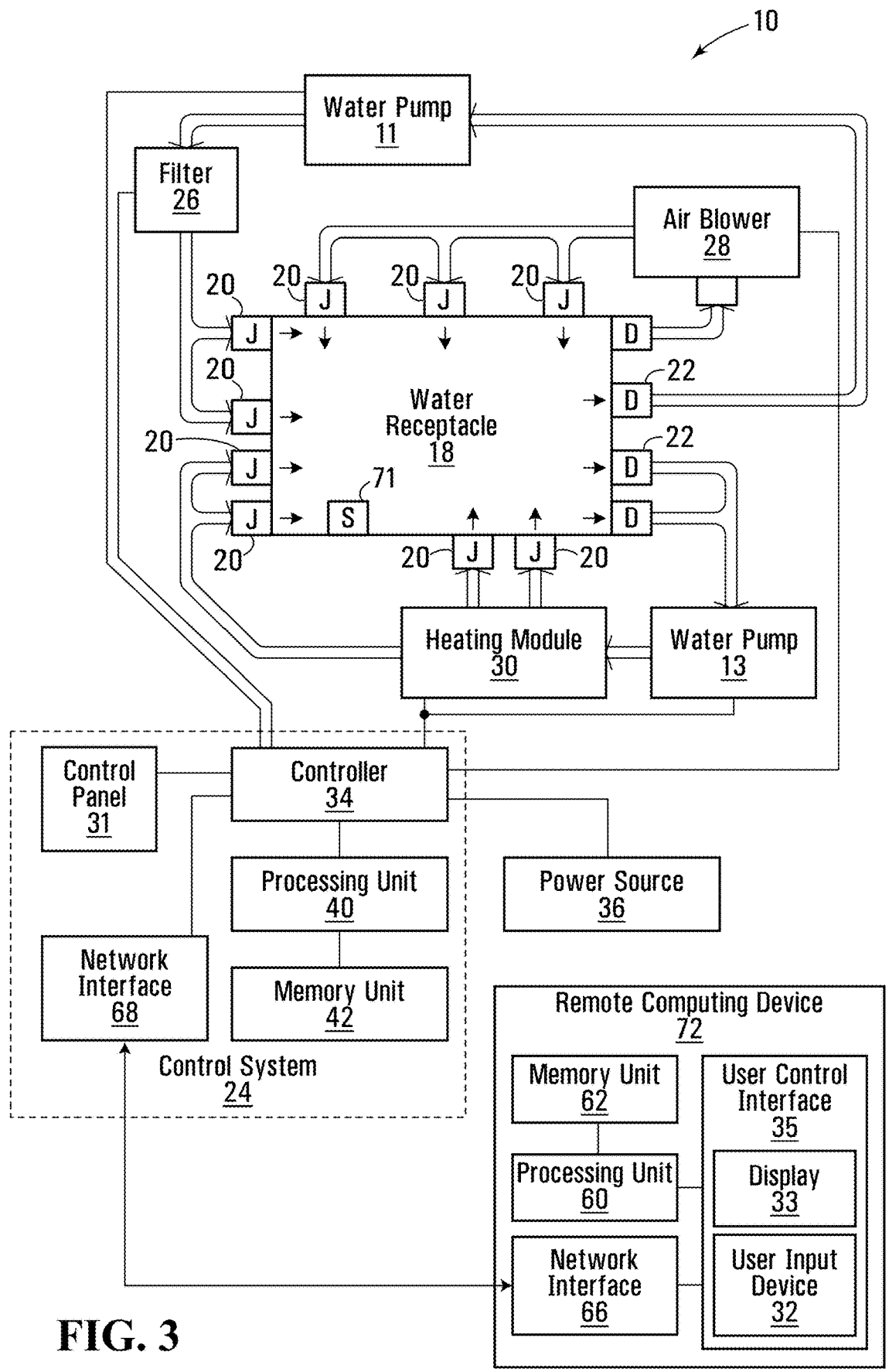
FIG. 3 shows a block diagram of a bathing unit system equipped with a bathing unit control system in accordance with a second non-limiting example of implementation of the present invention.

In accordance with a second non-limiting example of implementation shown in FIG. 3, instead of being included within the bathing unit control system 24, the user control interface is included within a remote computing device 72 that is in wireless connection with the controller 34, either directly or via a network connection. The remote computing device 72 could be in RF or infrared communication with the controller 34. However, for the purposes of the present description, the remote computing device 72 will be described as being in communication with the controller 34 via a network connection. The network connection can be any type of connection, such as a WiFi connection, zigbee connection, home network connection, Internet connection, wimax connection and plc (power line communication).

In the embodiment shown in FIG. 3, the bathing unit control system 24 comprises a control panel 31 (which may include a display and one or more user input devices) such that a user of the bathing unit system 10 can provide command signals to the controller 34 when in proximity to the bathing unit receptacle 18. The control system 24 further comprises a network interface 68 for allowing the controller 34 to communicate with other computing devices, such as the remote computing device 72, over a network connection.

Figure 4:
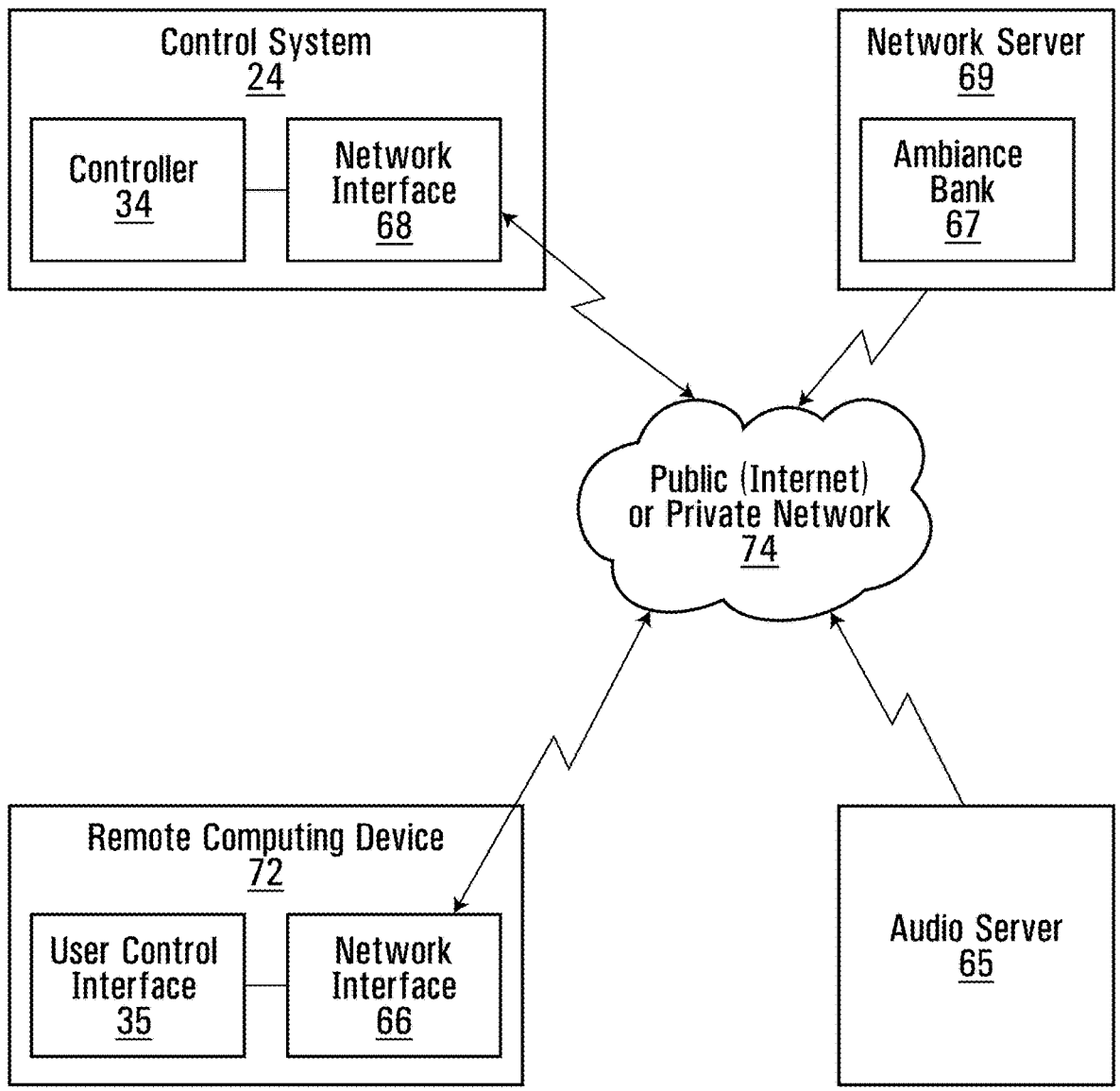
FIG. 4 shows a block diagram of a bathing unit control system and a remote computing device in accordance with a non-limiting example of the present invention in communication with each other via a network connection.

The user control interface 35 is implemented at the remote computing device 72, which also comprises a network interface 66, for allowing the remote computing device 72 to communicate with the controller 34 over a network connection. Shown in FIG. 4 is a non-limiting block diagram of the remote computing device 72 and the control system 24 in communication with each other over a network connection. Signals are released from the user control interface 35 of the remote computing device 72 through the network interface 66 and travel through a network 74 to the control system 24 of the bathing unit system 10. The network 74 may be either a public network, such as the Internet, or a private network, such as a private intranet. The signal released from the remote computing device 72 travels through the network 74 and is received at the bathing unit control system 24 by the network interface 68 that in turn passes the signal to the controller 34 for controlling the operation and activation of the bathing unit components.

As mentioned above, the network can be any type of network known in the art, including WiFi, zigbee, a home network, the Internet, wimax and plc (power line commication). As shown in FIG. 4, both the control system 24 of the bathing system 10 and the remote computing device 72 can be in communication with an audio server 65 for receiving internet radio, the ability to download mP3s or any other type of streaming audio for facilitating ambiance. The audio server 65 may also be able to provide video streaming to one or both of the control system 24 or the remote computing device 72 over the network 74.

As will be described in more detail below, the control system 24 of the bathing system 10 and/or the remote computing device 72 may be in communication with a network server 69 that stores a plurality of ambiance settings that can be downloaded, or otherwise delivered, to the control system 24 and/or the remote computing device 72 over the network 74. A user of the bathing system can thus obtain new ambiance settings (which will be described below) from an ambiance setting provider, which could be the spa manufacturer or a third party.

Referring back to FIG. 3, the remote computing device 72 further comprises a processing unit 60 and memory unit 62. The processing unit 60 is operative for processing program instructions and data stored in the memory unit 62 for implementing the functionality of the remote computing device 72. In the non-limiting embodiment shown, the user control interface 35 is in communication with this processing unit 60 and memory unit 62, such that the processing unit 40 can accesses and processes program instructions stored within the memory unit 42 for enabling the user control interface 35 to implement the graphical user interface on the display screen 33 and process the input commands received from the user via the user input device 32 of the user control interface 32. It should be appreciated that in an alternative non-limiting embodiment, the user control interface 35 may comprise a separate processing unit and memory unit that are dedicated to the functionality of the user control interface, instead of having the functionality of the user control interface be implemented by the processing unit 60 and memory unit 62 of the remote computing device.

The remote computing device 72 may be any type of computing device known in the art. For example, the remote computing device 72 may be a personal computer such as a desktop or laptop computer, or the remote computing device 72 may be a portable hand-held computing device, such as a PDA, a cell phone, a smart phone (such as a Blackberry™ or an iPhone™), or a web-enabled computing device (such as an iTouch™, iPad™ or computer Tablet, among other possibilities.

It is to be understood that the functionality of the user control interface 35 could be implemented by any suitable hardware and/or hardware/software combination without departing from the spirit and scope of the present invention.

In a non-limiting example, the user control interface 35 includes a microprocessor. As described in both of the embodiments described above, the apparatus implementing the user control interface 35 is configured as a computing unit including a processor and a memory connected by a communication bus. The memory includes data and program instructions. The processor is adapted to process the data and the program instructions in order to implement the functionality of the user control interface, and possibly the graphical user interface, described in the specification and depicted in the drawings. The computing unit (such as the remote computing device 72 or the bathing control system 24, may also comprise a number of interfaces for receiving or sending data elements to external devices.

Figure 5:
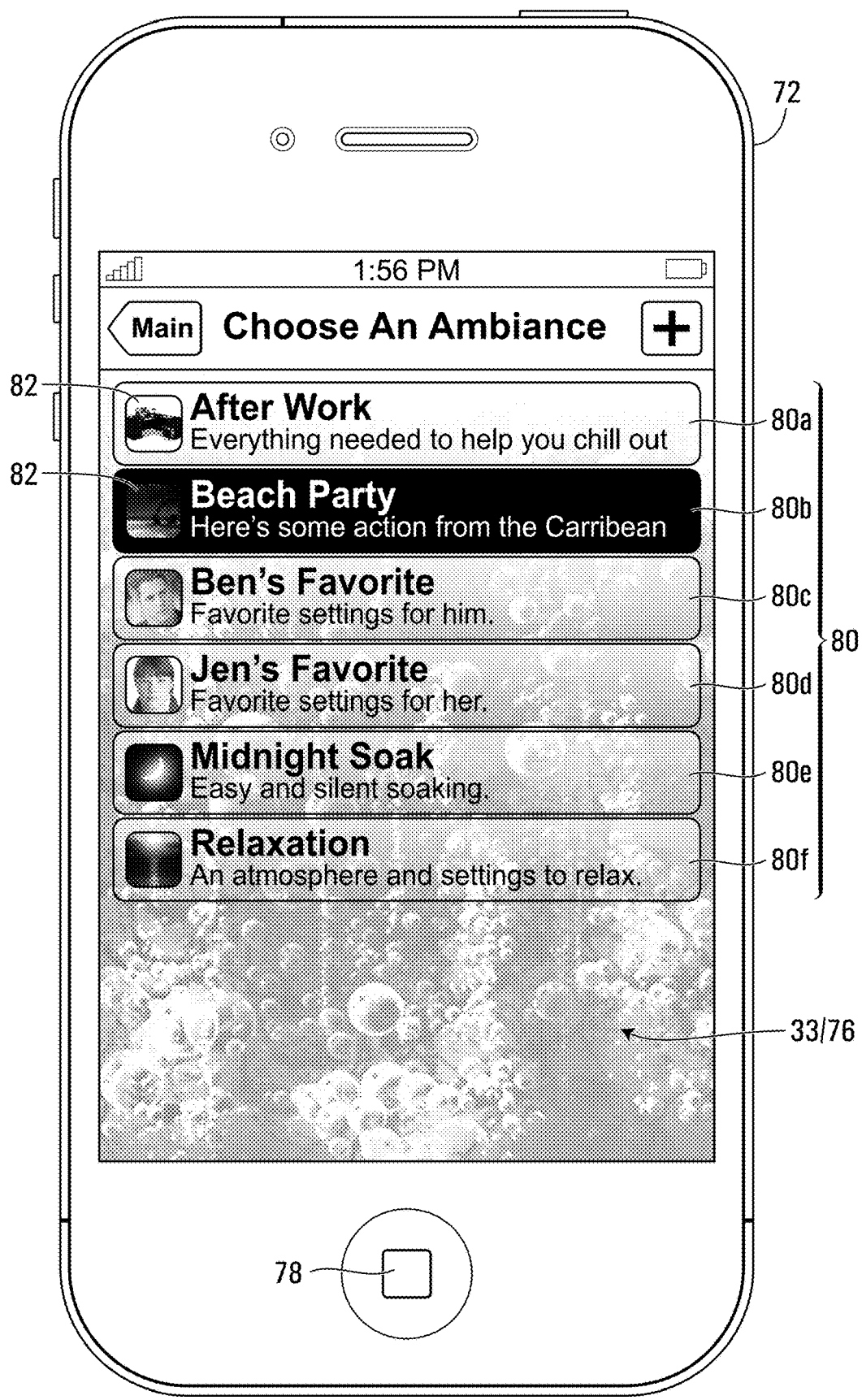
FIG. 5 shows a physical representation of the user control interface of FIG. 3 in accordance with a non-limiting example of implementation of the present invention, with a non-limiting example of a display page of a graphical user interface displayed thereon.

Shown in FIG. 5 is a non-limiting example of a physical representation of the user control interface 35 of FIG. 3, implemented on the remote computing device 72. In the non-limiting example shown, the remote computing device 72 is an iPhone and the graphical user interface implemented thereon, that will be described in more detail below, is an iPhone App designed specifically for allowing remote control of a bathing unit system 10. It should be appreciated however, that the remote computing device 72 is not limited to an iPhone and the GUI is not limited to an iPhone App. As indicated above, the remote computing device 72 could be any type of computing device, such as those described above, and the graphical user interface implemented thereon could be suitable for being run on any such computing devices.

The remote computing device 72 comprises a display screen 33 and a user input device 32. In the embodiment shown, the user input device 32 comprises a button 78 and a touch sensitive screen 76 that can be touched by a user in order to scroll through and select options offered by the graphical user interface displayed on the display screen 33. Each area of the screen is associated with a respective function that is activated when the area of the screen is touched by the user. Although the user input device 32 shown in FIG. 5 comprises a touch sensitive screen 76 and a button 78, it should be appreciated that any other type, or combination, of user input devices known in the art could be used, including a pointing device, a keypad, a touch sensitive screen, dials, a stylus pen or a microphone connection to a speech recognition unit, among other possibilities.

The user control interface 35 that is implemented on a remote computing device 72, as described above, is suitable for providing a user with remote access to the controller 34 of the bathing unit system 10. More specifically, the remote computing device 72 can communicate with the bathing unit controller 34 over a network communication link for transmitting signals entered by a user via the user control interface 34. In this manner, a user can provide commands to the controller 34 in order to activate and/or modify the operational settings of the bathing unit components without actually having to be in proximity to the bathing unit receptacle 18. For example, a user may be able to initiate activation of the bathing unit components, and/or adjust the operational settings of the bathing unit components, while the user is travelling home from work, such that the bathing unit system 10 is ready for the user by the time the user gets home.

Ambiance Settings

As indicated above, the user control interface 34 is able to display a graphical user interface to a user for enabling the user to provide instructions to the controller 34 for causing the activation and/or adjustment of the operational settings of the bathing unit components. In order to provide instructions to the controller 34, a user may enter a desired operational setting for each individual bathing unit component via the graphical user interface. For example, the user may first access the pumps, and provide a desired operational setting for the pumps. The user may then access the temperature control and provide a desired operational setting for the water temperature. The user may then access the audio system in order to select a desired audio output (such as a radio station or an MP3 playlist).

Alternatively, instead of providing a desired operational setting for each bathing unit component independently, a user may select, via the graphical user interface, a particular ambiance setting for causing a set of bathing unit components to acquire pre-programmed operational settings associated with the selected ambiance setting. As such, when a given ambiance setting is selected, the controller 34 causes the operational settings for a set of bathing unit components to be activated and/or adjusted without the user having to independently provide an operational setting for each individual bathing unit component in the set of bathing unit components.

Examples of ambiance settings may include a "relaxation setting", a "beach party" setting, an "after work" setting, as well as individual users' favorite settings, such as "Jen's favorite setting" and "Ben's favorite setting". Each setting will include pre-programmed operational settings for a set of bathing unit components. For example, in the case of the "relaxation setting", the water jets may be pre-programmed to acquire a low jet speed, the lighting units may be pre-programmed to provide dim white light, and the audio system may be pre-programmed to acquire a soundtrack mimicking sounds of the ocean. In contrast, in the case of the "beach party setting", the water jets may be pre-programmed to acquire a high jet speed, the lighting units may be pre-programmed to acquire a flashing colors of light, a sanitation system is pre-programmed to be on a multi-person level, and the audio system may be pre-programmed to play an MP3 playlist of Caribbean music. Obviously, the particular operational settings associated with each ambiance setting can vary significantly and the present invention is not limited to any specific pre-programmed operational settings.

The ambiance settings may be programmed by a manufacturer of the bathing unit system 10 or by an individual user. For example, the manufacturer of the bathing unit system 10 may pre-program a plurality of different ambiance settings into the memory unit 42 of the bathing unit control system 24. It is also possible for a user of the bathing unit system 10 to program one or more different ambiance settings into the memory unit 42 of the control system 24, or into the memory unit 62 of the remote computing device 72. It is also possible that the manufacturer of the bathing unit system 10, or a third party, may offer pre-programmed ambiance settings for download to a memory unit of either the control system 24 or the remote computing device 72.

Non-limiting examples of graphical user interfaces that are implemented by the user control interface 35 will now be described in more detail. It will be apparent to the person skilled in the art in light of the present description that embodiments of the invention having different graphical interfaces for displaying and providing ambiance settings are also possible without detracting from the spirit of the invention. It will further be apparent to the person skilled in the art in light of the present description that embodiments of the invention providing multiple different graphical user interfaces for controlling sub-combinations of the functions described below are also possible without detracting from the spirit of the invention.

Viewing the Ambiance Settings

In accordance with a non-limiting example of implementation of the present invention, the user control interface 35 is operative to present sequentially a first display page and a second display page of a graphical user interface. Referring back to FIG. 5, on the display screen 33 is a non-limiting example of a first display page which displays a plurality of ambiance settings 80 selectable by a user of the user control interface 35. In the example shown, the first display page shows six possible ambiance settings entitled "after work" 80a, "beach party" 80b, "Ben's favorite" 80c, "Jen's favorite" 80d, "midnight soak" 80e and "relaxation" 80f.

In the embodiment shown, each of the ambiance settings is identified by name and is provided with a brief description of the setting. In addition, each of the ambiance settings is associated with a pictorial icon 82 displaying giving a pictorial or photographic representation of the ambiance setting. For example, the "beach party" 80b ambiance setting is associated with a pictorial icon 82 displaying a palm tree, and "Ben's favorite" 80c ambiance setting is associated with a pictorial icon displaying a photographic picture of Ben. These pictorial icons help a user to quickly and easily identify a desired ambiance setting. In alternative embodiments, the description of the ambiance setting and the pictorial icons 82 are not included within the first display page.

In order to select a ambiance setting via the graphical interface the user of the user control interface 35 uses the user input device 32 in order to indicate a selected one of the plurality of ambiance settings 80. In the embodiment shown in FIG. 5, wherein the user input device 32 is a touch sensitive screen, the user places his/her finger on the selected ambiance setting. In the example that will be described herein, the user selects the "beach party" 80b ambiance setting.

This selection is received at a processor (such as processor 40 or 60) in communication with the user control interface 35, for causing the user control interface 35 to display via the graphical user interface the second display page on which are displayed the operational settings associated with the ambiance setting for a set of bathing unit components.

Figure 6:
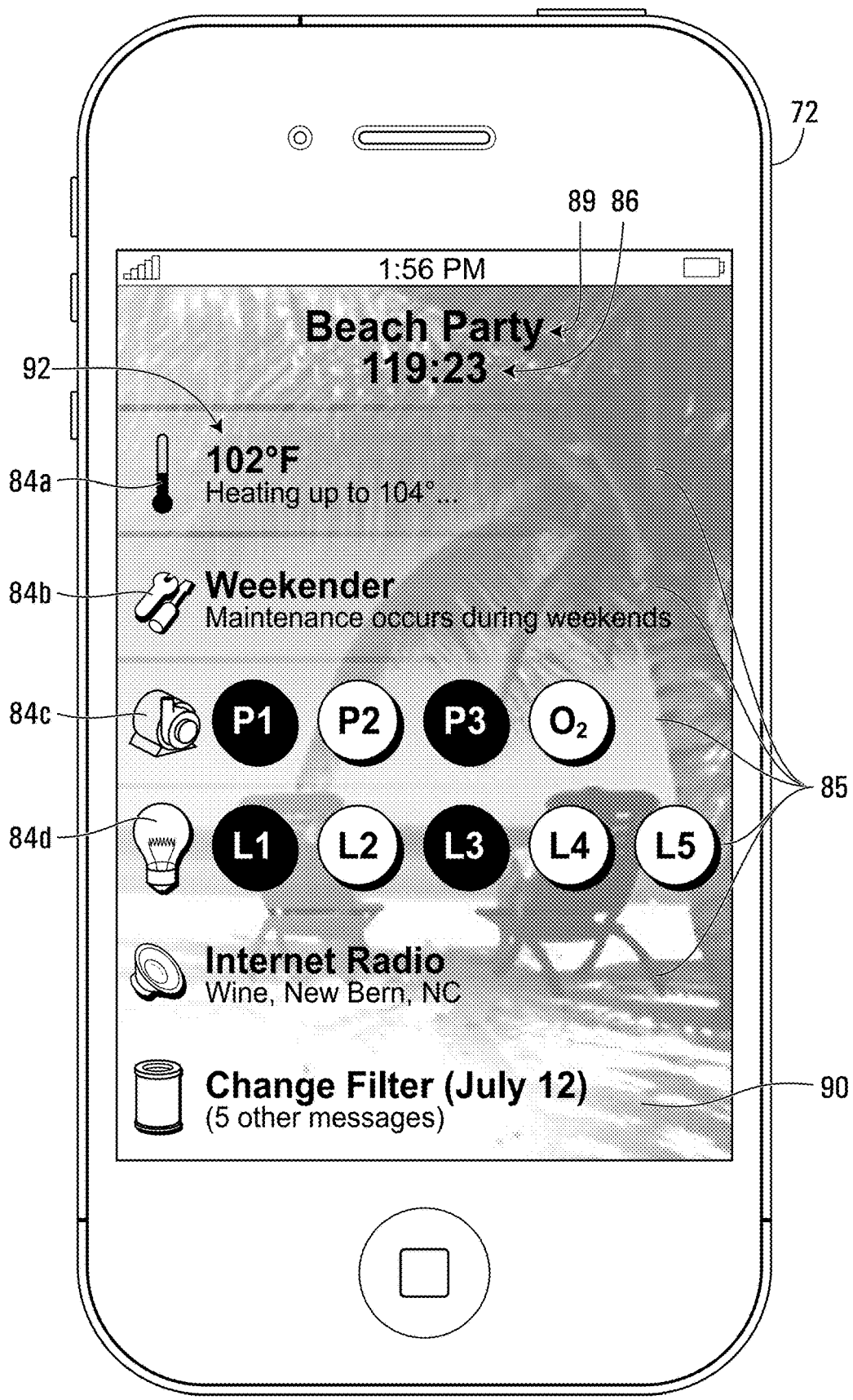
FIG. 6 shows the physical representation of the user control interface of FIG. 5 with an alternative non-limiting example of display page of a graphical user interface displayed thereon.

Shown in FIG. 6 is a non-limiting example of a second display page showing the operational settings associated with the "beach party" 80b ambiance setting for a set of bathing unit components. Although the operational settings associated with the "beach party" 80b ambiance setting are described and shown herein as being displayed on a second display page of the graphical user interface, they could be displayed on the same page as the plurality of ambiance settings 80, described above with respect to FIG. 5. For example, upon selection of the "beach party" 80b ambiance setting, the operational settings associated therewith could appear on the same page below the list of ambiance settings 80.

When the processor receives the indication of the selected ambiance setting, in addition to displaying the pre-programmed operational settings associated with the selected ambiance setting (as will be described in more detail below), the processor may also issue a signal to the controller 34 for causing the pre-programmed operational settings to be implemented by the bathing unit components. However, in an alternative example of implementation, only after receiving confirmation from a user that the displayed pre-programmed operational settings should be implemented by the bathing unit components, is a signal released to the controller 34 for causing adjustment and/or activation of the pre-programmed operational settings. In such a case, the graphical user interface may comprise an input area for enabling a user to authorize the implementation of the pre-programmed authorized settings by the bathing unit components. As will be described in more detail below, this also provides the user with the ability to make adjustments to the pre-programmed operational settings, before these operational settings are caused to be implemented by the bathing unit components.

Referring now to FIG. 6, a non-limiting example of a second display page of a graphical user interface on which are displayed the operational settings that have been pre-programmed in association with the "beach party" 80*b* ambiance setting. In the embodiment shown, the graphical user interface displays operational settings associated with four different types of bathing unit components; namely the heating module, the water pumps, the lighting units, and the audio system. By displaying the pre-programmed operational settings for multiple different bathing unit components, a user is advantageously provided with a good visual overview of the operational settings associated with the ambiance setting.

It should be appreciated that each type of bathing unit component may include multiple bathing unit components, and the graphical interface may display the pre-programmed operational settings for the multiple bathing unit components of a given type of bathing unit component. In the example shown, three different water pumps and an ozonator are displayed in connection with the "pump" type of bathing unit component. As such, a user is able to quickly view that the "beach party" 80*b* ambiance setting has pre-programmed pump P1 and P2 to be activated, while pumps P2 and the ozonator are deactivated. Likewise, five different lighting units are displayed in connection with the "lighting" type of bathing unit component. As such, a user is able to quickly view that the "beach party" 80*b* ambiance setting has pre-programmed lights L1 and L3 to be activated, while lights L2, L4 and L5 are deactivated. The operational settings for the pumps and lighting devices displayed on the graphical user interface of FIG. 6 show whether or not a given pump or lighting device is active or deactive, but not necessarily a level of activation of each bathing unit component. In the "beach party" 80*b* ambiance setting, the heating module is pre-programmed to cause the water to acquire a 104° water temperature, and the audio system is pre-programmed to broadcast the "Wine, New Bern" internet radio station out of North Carolina.

Figure 7:
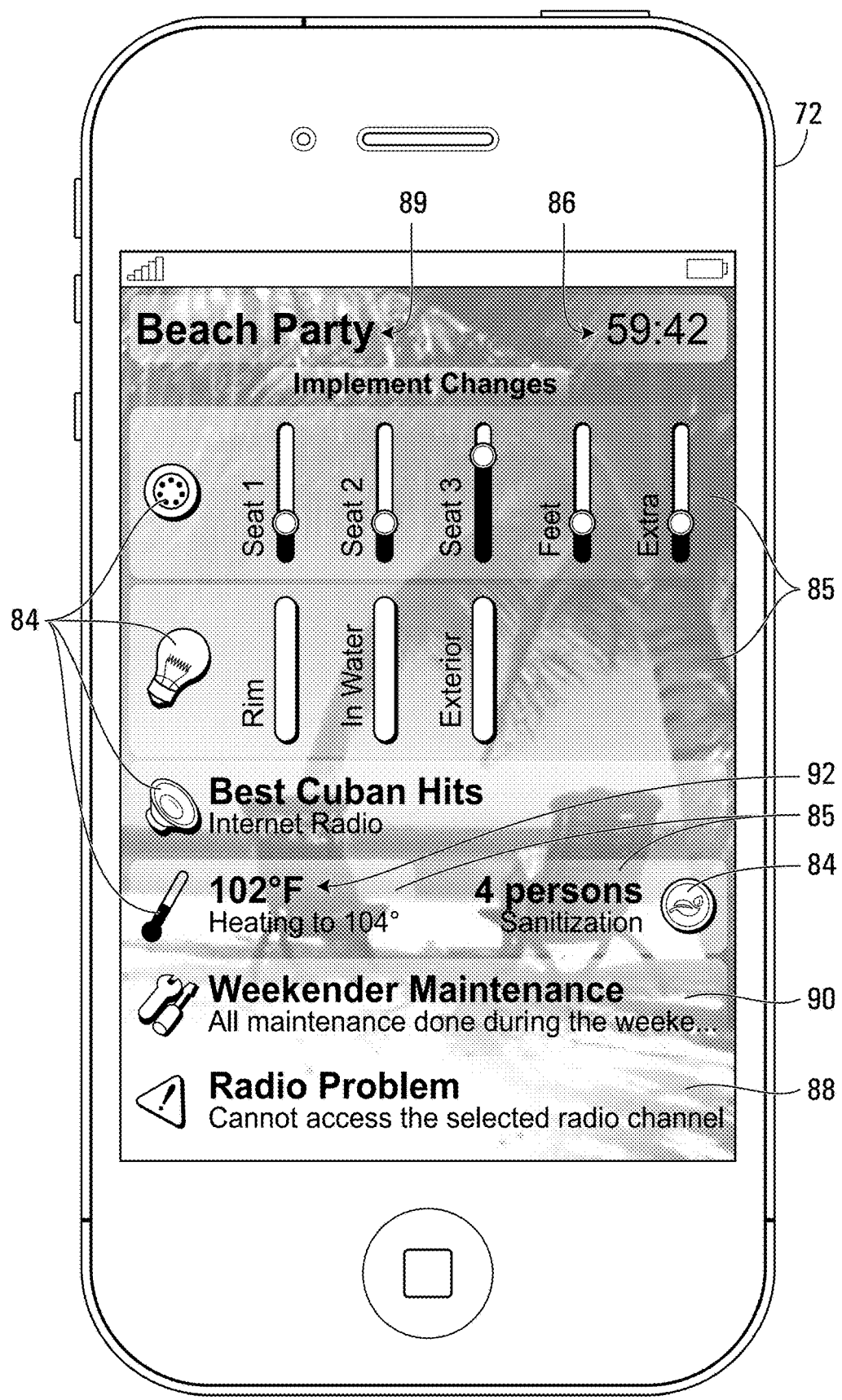
FIG. 7 shows the physical representation of the user control interface of FIG. 5 with an alternative non-limiting example of display page of a graphical user interface displayed thereon.

Shown in FIG. 7 is an alternative non-limiting example of a second display page of a graphical user interface on which is displayed operational settings that have been pre-programmed in association with the "beach party" 80*b* ambiance setting. In this alternative embodiment, the operational settings associated with the "beach party" 80*b* ambiance setting are different from those shown in FIG. 6, demonstrating that the graphical user interface, and the operational settings, can vary without departing from the spirit of the invention. The graphical user interface of FIG. 7 displays operational settings associated with five different types of bathing unit components; namely the variable speed water pumps for the water jets, the lighting units, the audio system, the heating module and the sanitization system. Furthermore, the graphical user interface not only shows whether or not a given bathing unit component is active, but it also shows a level of activation associated with the bathing unit component. For example, in the case of variable speed pumps for the water jets, these pumps can acquire multiple speeds that can change the water flow at the jets, it can be seen that the pump speed for seat 3 is set at a higher operational setting than the pump speed for seats 1 and 2. Furthermore, and although not shown in FIG. 7, instead of selecting a single speed for a pump, the user can select a pre-programmed massage function for each variable speed pump, that provides a sequence of different speeds according to a pre-defined massage profile.

As for the light, the user can select the a desired color (not shown in FIG. 7) as well as a desired light intensity. In the case that the user wants to adjust the light color, this can be done by moving a finger on a spectrum sample display on the user interface. Or a list of pre-programmed color sequences can be selected to create some ambiance effect.

Although the bathing unit types for which operational settings have been described in FIGS. 6 and 7 comprise the water heater, the water pumps, the lighting units, the variable speed pumps for the water jets, the audio system, and the sanitization system, it should be appreciated that the bathing unit types could also include any other bathing unit type known in the art.

As mentioned above, in addition to causing the user control interface 35 to display the pre-programmed operational settings associated with the selected ambiance setting, the processor (such as processor 40 or 60) may also issue a signal to the controller 34 for causing the pre-programmed operational settings to be implemented by the bathing unit components. Alternatively, the processor will wait to receive a confirmation signal from a user that the displayed pre-programmed operational settings should be implemented by the bathing unit components, before issuing a signal to the controller 34 for causing the pre-programmed operational settings to be implemented. In such a case, the graphical user interface may comprise an input area, such as an "implement" button, for enabling a user to authorize the implementation of the pre-programmed authorized settings by the bathing unit components.

Included on the graphical user interfaces shown in FIGS. 6 and 7 is a plurality of additional information, other than just the pre-programmed operational settings. For example, the graphical user interface comprises an information area 89 for identifying the ambiance setting that has been selected by the user. In the embodiment shown, the identification of the ambiance setting is a textual indication of "beach party". The graphical user interfaces further comprise additional information areas for providing pictorial representations 84*a-d* of the different types of bathing unit components. For example, a pictorial icon/representation of a pump 84*b* is included next to the pump operational settings and a pictorial icon/representation 84*c* of a light bulb is included next to the lighting unit operational settings. These pictorial representations 84*a-d* help a user to quickly and easily identify a type of bathing unit component for which pre-programmed operational settings are provided. In alternative embodiments, the pictorial icons/representations 84*a-d* are not included.

In accordance with a non-limiting embodiment, the graphical user interfaces further provide time information 86 associated with the ambiance setting. The time information 86 shown in FIG. 6 is indicative of the amount of time that the selected ambiance setting has been in operation, and the time information 86 shown in FIG. 7 is indicative of a countdown of the remaining activation time of the selected ambiance setting. Other time information could also be included without departing from the invention. For example, the time information could be indicative of the local time, the amount of time since the last change to an operational setting, the amount of time until the operational settings have been acquired by the bathing unit components or any other possible time information that could be useful to a user of the bathing unit system. As discussed, the timer can be customized and different for each of the ambiance settings.

In addition, the mood ambiance that is selected may change operational settings over the course of a given time period. For example, an ambiance setting that may be called "spa night" could start with slow music, dim lighting and a water fall setting for a first period of time (such as a first hour) during a dinner and cocktail period, then during a second period of time (such as a second hour) the operational settings associated with the "spa night" ambiance setting will shift towards more up-beat party music, active lighting and strong jets. The "spa night" mood setting may then adjust the operational settings again for a third period of time (such as a third hour) in order to create a wind-down period which will have slow and relaxing music, the variable speed water pumps for the water jets will be on a massage setting and the lighting will be dark and soft.

Maintenance Alerts and Reminders

As will be described below, the graphical user interface implemented by the user control interface 35 may further display maintenance reminders and alerts. Conventional bathing systems require frequent and regular monitoring of the water quality, temperature and other parameters in order to ensure that the bathing system is operating in accordance with a desired manner. Maintenance, including for example adding different chemicals to the water to ensure that the water is sanitary, must also be done at the correct frequency. In addition, when problems are detected in a bathing system, for example a blocked pipe or a high-temperature condition, some remedial action must take place in order to rectify the situation. For bathing system owners, this represents added tasks, in addition to regularly scheduled maintenance. It is not infrequent that bathing system owners simply forget to perform some required maintenance, or repairs, on their equipment. This may result in decreased performance and longevity of the bathing system.

In order to help a bathing system owner perform the necessary maintenance and repairs on their bathing system, the controller 34 is operative for monitoring different parameters of the bathing system and/or the individual bathing unit components. In order to perform this monitoring, the controller 34 may be in communication with a variety of sensors for detecting different operational parameters associated with the bathing unit components. These sensor readings can be processed by the controller 34 against established operating parameters, for determining whether there are any operating errors. Many algorithms and methods for detecting errors are known in the art and the present invention is not limited to any of these methods. The controller 34 may further record when maintenance is performed on the bathing system, or individual bathing unit components, such that reminders can be generated when future maintenance is required.

In accordance with the present invention, the controller 34 is capable of communicating with the user control interface 35 in order to cause alerts, reminders or other notifications concerning the maintenance or repair of the bathing system to be issued and displayed to a user. As shown in the Figures, such notifications can be provided to the user through a graphical user interface that is displayed to a user on the display screen 33 of the user control interface 35. In the figures, these notifications can include, but are not limited to:

error alerts 88;

maintenance reminders 90; and past-due notifications 91.

In the embodiment shown, these notifications are provided on the second display page of the graphical user interface. It should however be appreciated that these notifications can be provided on any other suitable display page of the graphical user interface, or via an email, text message, pop-up box, phone call or push alert. The user may be able to select the preferred method of communication for these notifications.

Shown in FIG. 7, is a non-limiting example of an error alert message 88 indicative of a problem with the radio. Any other type of error alert message may also be included within the scope of the present invention. Some non-limiting examples of possible error messages include:

there is a blockage in the circulation pipes;

the filter is not functioning;

the heater is not functioning;

there is an overheat condition;

etc.

Figure 8:
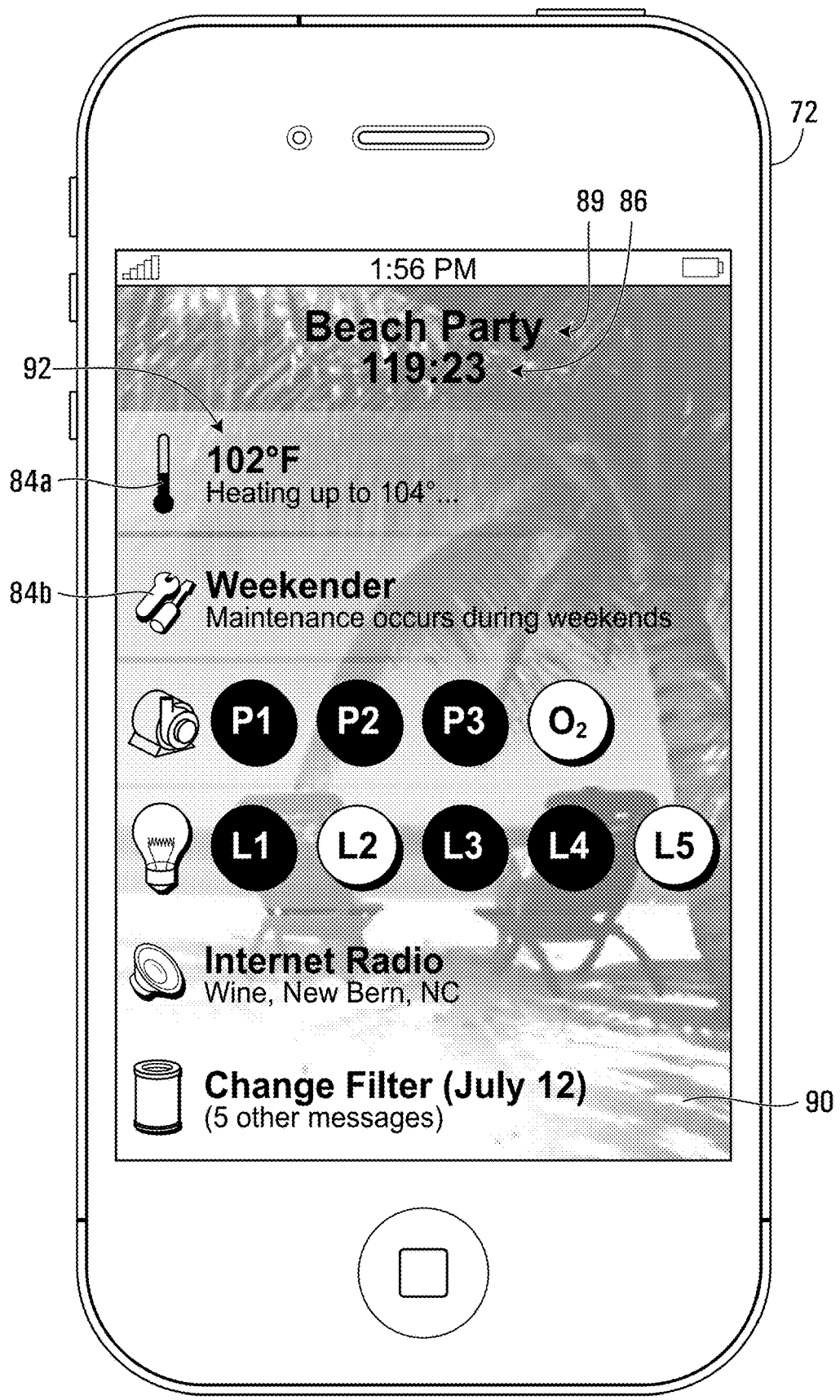
FIG. 8 shows the physical representation of the user control interface of FIG. 5 with an alternative non-limiting example of display page of a graphical user interface displayed thereon.

The graphical user interface may further display maintenance reminders 90 advising the user of maintenance that needs to be done, or updates to that need to be made to the system. The graphical user interface shown in FIGS. 6-8 shows maintenance reminders 90 advising the user of maintenance issues such as:

the filter needs to be changed;

maintenance is going to be performed on the weekend;

Any other type of reminder message or information message could also be displayed to a user. This feature may be combined with a maintenance schedule wherein regularly scheduled maintenance activities would be programmed into the system, such that the controller 34 could cause periodic reminders to be provided to the user. For example, the changing of the filter, the addition of chemicals to the water at periodic intervals, etc. It is also noted that the maintenance schedule may also be configured to be adaptable based on the usage of the spa system. To do so, information concerning usage, for example for the user of the pumps, lights and/or other features of the spa system could be provided in the computation of the delay between successive maintenances.

The graphical user interface may further display a status relating to a particular operating parameter associated with the bathing unit system 10. For example, and as shown in FIGS. 6 and 7, the graphical user interface displays an operating parameter 92 associated with the water temperature, which is currently indicated as being at 102° F. While the operating parameter 92 shown in FIGS. 6 and 7 is a real-time water temperature, other parameters, such as a current maintenance status, whether or not the spa is in use, an alert that a given water temperature has been achieved, the filtration status, sanitization status, audio/visual status, an alert that a play-list has come to an end, may also be displayed.

Customization of the User Interface on a Basis of a Selected Ambiance Setting

As indicated above, once a user has selected a desired ambiance setting from a plurality of ambiance settings (as shown in FIG. 5), the pre-programmed operational settings associated with the selected ambiance setting are displayed to the user via a graphical user interface. In accordance with a non-limiting embodiment, a display setting associated with the display of the pre-programmed operational settings is configured at least in part on the basis of the selected ambiance setting. For example, the appearance of the graphical user interface may be customized in accordance with the ambiance setting selected by the user.

The configured display setting may be part of the second display page or, in the case where the operational settings are not displayed on a separate display page, a display setting for the same display page as the plurality of ambiance settings may be configured. The configured display setting may be a background graphic associated with the selected ambiance setting, a pictorial icon associated with the selected ambiance setting or a particular set of bathing unit components associated with the selected ambiance setting, among other possibilities.

FIGS. 6 and 7 show an example wherein the background graphic "display setting" is configured on the basis of the selected ambiance setting. In these figures, it is the "beach party" 80b ambiance setting that has been selected, and so the background graphic is customized so as to be appropriate for the "beach party" ambiance setting. In the example shown, the background graphic shown for the "beach party" ambiance setting is a palm tree on a beach which is an image that invokes a beach party atmosphere.

In an alternative embodiment, such as in the case where "Ben's favorite" ambiance setting has been selected, the display setting that is configured on the basis of this selected ambiance setting may be a pictorial icon. For example, when the operational settings associated with this ambiance setting are displayed either on a second display page, the display may include a photographic picture of Ben, thereby showing that these operational settings belong to the "Ben's favorite" ambiance setting.

In yet a further example of a display setting configured on the basis of the selected ambiance setting, the particular set of bathing unit component types that are displayed may vary and thus be configured depending on the ambiance setting selected. For example, in the case of the "beach party" ambiance setting, the set of bathing unit components for which operational settings are displayed may be the heating module, the water pumps, the lighting units and the audio system (as shown in FIG. 6), whereas in the case of the "relaxation" ambiance setting, the set of bathing unit components for which operational settings are displayed may be the water jets, the heating module, the lighting units, the sanitization system and the audio system.

The graphical user interface can further be customized or configured to provide the user with functionality options that are customized in accordance with the ambiance selection. For example, depending on the ambiance selection, a listing of options for music that is appropriate for the selected ambiance may be presented. For example, although a default music selection may be provided for a "beach party" ambiance, alternate music selections may also be presented to the user allowing the user to select an alternate music type for the same ambiance. The default music selection may be "Caribbean music", but options for a "summertime mix" and a "top 40 mix" may also be provided. For the relaxation ambiance, the option displayed to the user for the music selection will be different than those presented to the user for the party ambiance selection.

Other customized options may also be presented to a user for other operational settings, such as for the lighting, water pumps, water jets, audio-visual components and temperature, among other possibilities. In the customized lighting options for the "beach party" ambiance, a default lighting setting may be to have all the lights activated. However, other options may be to have yellow and green colored lights activated, or to have color lights be intermittently activated. The lighting parameter options would be different for the "relaxation" ambiance setting. By customizing "display settings" of the graphical user interface, the user is presented with a simplified interface control for the spa which facilitates the usage of the spa by a novice user.

Adjusting the Operational Settings of a Ambiance Setting

Once a user has selected a desired ambiance setting and the pre-programmed operational settings associated with the selected ambiance setting have been displayed to the user via the graphical user interface, the user can then make adjustments to these pre-programmed operational settings. This may be done before or after the pre-programmed operational settings are caused to be implemented by the bathing unit components.

For example, in the case of the pre-programmed operational settings associated with the "beach party" ambiance setting shown in FIG. 6, Pumps P1 and P3 are pre-programmed to be the activated pumps. If the user would like to modify these pre-programmed settings, such that pump P2 is also activated, for example, the user can use the user input device 32, which in the case of the example shown in FIG. 6 is a touch sensitive screen, in order to cause pump P2 to be activated. This can be done by the user touching the screen over an input area, such as the circle designated "P2". The input area for causing the adjustment to the pre-programmed operational setting for the pumps type of bathing unit component is located next to the pictorial icon 84b representative of the pumps. Shown in FIG. 8 is a non-limiting example of the graphical user interface of FIG. 6, after the user has adjusted the operational settings such that pump P2 is also active.

Once a user has indicated that pump P2 should be activated, the processor (such as processor 40 or 60) can then either automatically issue a signal to the controller 34 for causing the adjustment or change to be implemented by the bathing unit components, or the processor can wait until a user has provided an additional confirmation signal, such as via an "implement" button on the graphical user interface. The user may make adjustments to the pre-programmed operational setting of one bathing unit component, or multiple bathing unit components. In addition, the user may adjust the activation or deactivation of a bathing unit component, or the user may adjust a level of an operational setting of a bathing unit component. For example, in the case of the graphical user interface shown in FIG. 7, a user may adjust the level of the water pump associated with seat 3, by lowering the circle indicator within the vertical track. It should be appreciated that the manner in which a user can adjust and/or activate/deactivate a bathing unit component can vary without departing from the spirit of the invention.

When adjusting one or more of the pre-programmed operational settings associated with an ambiance setting, these adjustments can be treated in the following manner:

In a first non-limiting example, the adjustments to the pre-programmed operational settings of a given ambiance setting entered by a user are temporary adjustments. The adjustments are caused to be implemented by the associated bathing unit components either as the user is entering the desired adjustments via the graphical user interface, or upon receipt of an indication from a user that the adjustments should be implemented, such as when the user hits an "implement changes" button, as shown in FIG. 7, for example. However, these are temporary adjustments that are implemented by the bathing unit components, but are not stored or recorded in association with the ambiance setting. There is no permanent adjustment to the pre-programmed operational settings associated with the selected ambiance setting. If a user were to stop the ambiance setting after having made the adjustments to the pre-programmed operational settings, and then re-select the ambiance setting at a later time or date, it would be the original pre-programmed operational settings that would still be associated with that ambiance setting.

Figure 9:
FIG. 9 shows the physical representation of the user control interface of FIG. 5 with an alternative non-limiting example of display page of a graphical user interface displayed thereon.
Figure 10:
FIG. 10 shows the physical representation of the user control interface of FIG. 5 with an alternative non-limiting example of display page of a graphical user interface displayed thereon.

In a second non-limiting example, the adjustments to the pre-programmed operational settings entered by the user are recorded in association with that ambiance setting, such that the entered adjustments become the new pre-programmed operational settings associated with that ambiance setting. In this manner a user is able to update or tweak the operational settings associated with a given ambiance setting. Shown in FIG. 9 is a non-limiting example of a display page showing the pre-programmed operational settings associated with the "relaxation" ambiance setting. In the example shown, the pre-programmed operational settings are such that the water jets associated with seat 1, seat 2 and the feet are active, and the in-water and rim lighting devices are active. Assuming that a user wants to adjust the operational settings associated with the "relaxation" ambiance setting, the user can enter desired adjustments. Shown in FIG. 10 is a non-limiting example of the adjustments made to the operational settings. More specifically, in a first input area 96 associated with the water jets, the user is able to modify the operational settings for this first type of bathing unit component; namely the water jets. In the example shown, the user has adjusted the operational settings such that only the water jets associated with seat 1 and seat 3 are active. Then, in a second input area 98, associated with the lighting devices, the user is able to modify the operational settings for this second type of bathing unit component; namely the lighting devices. In the example shown, the user has adjusted the operational settings such that only the lighting device associated with the rim is active. These adjustments to the operational parameters can be done using a user input device, which in the example shown is a touch sensitive screen. Once the user has entered the adjustments to the operational changes, the user may hit a "save" button on the graphical user interface, or on the device itself, in order to cause the adjustments to the operational changes to be recorded in relation to the ambiance setting. Thus, if a user were to stop the "relaxation" ambiance setting after having saved the desired adjustments to the pre-programmed operational settings, and then re-select that ambiance setting at a later time or date, it would be the new adjusted operational settings that would be associated with that ambiance setting. In this manner, a user is able to adjust the pre-programmed operational settings associated with a ambiance setting to be more desirable to the user.

The user control interface may further comprise functionality for enabling a user to revert back to the original pre-programmed operational settings for a given ambiance setting. For example, if a user saves his/her updated user-defined operational settings, but then later on decides that the manufacturer-defined operational settings for that given ambiance setting were preferable, the user may cause the user control interface to retrieve the original manufacturer-defined operational settings. This may be done by accessing a "return to default" menu item, or button.

In a third non-limiting example, the user may make adjustments to the pre-programmed operational setting of a given ambiance setting, and then record the adjusted operational settings in association with a new user-defined ambiance setting. In this manner, the adjusted operational settings become associated with an entirely new ambiance setting. Referring back to FIG. 10, and assuming that the user has entered the same adjustments to the operational settings as described above, instead of hitting the "save" button 100, the user may hit a "save as" button 102 on the graphical user interface, or on the device itself. The user would then be provided with the opportunity to enter a new name for a ambiance setting to which the adjusted operational settings would be recorded. Thus, if a user were to stop the ambiance setting after having saved the adjustments to the pre-programmed operational settings, the user would then have to open the new user-defined ambiance setting in order to cause the bathing unit components to implement the adjusted pre-programmed operational settings.

Figure 11:
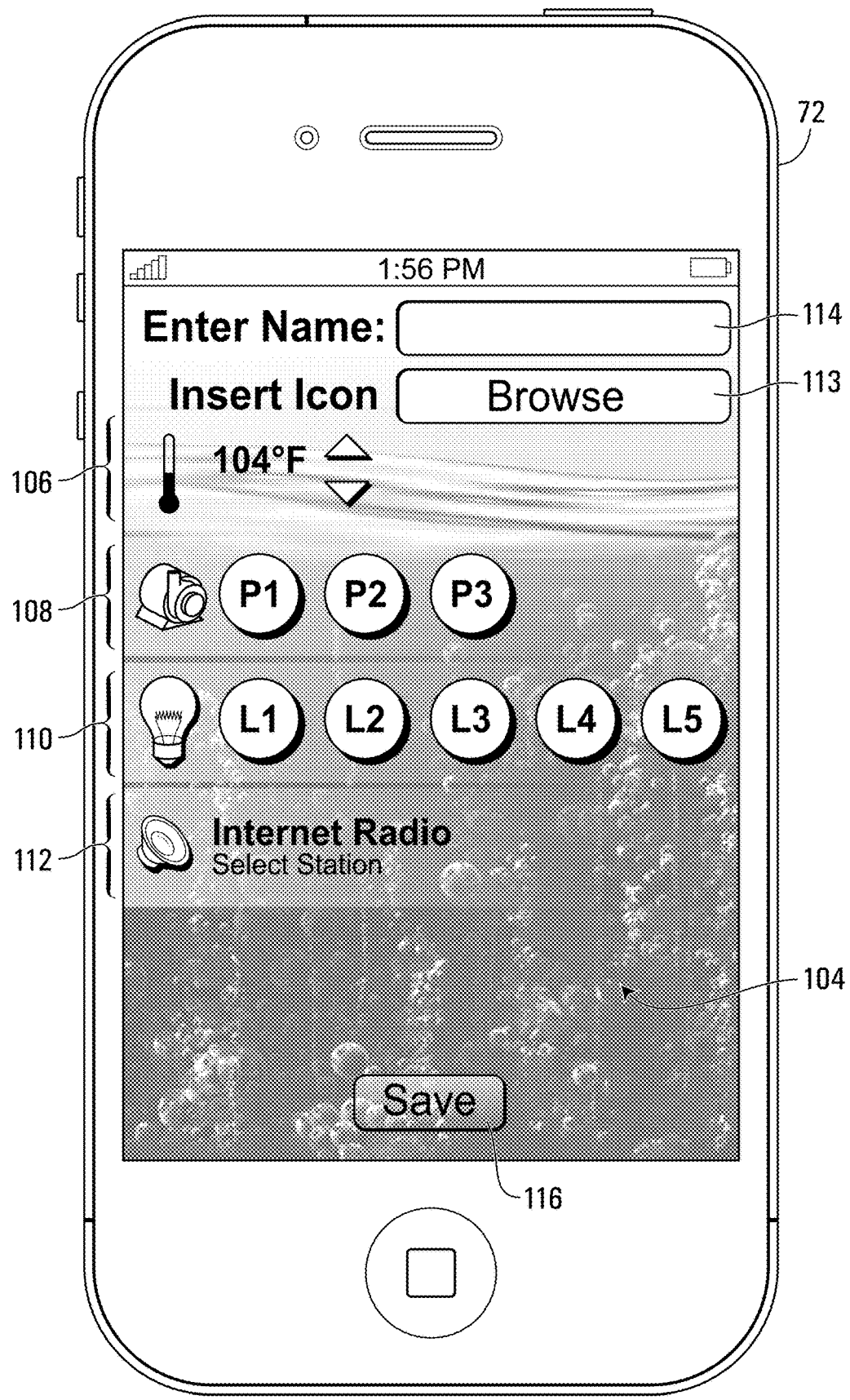
FIG. 11 shows the physical representation of the user control interface of FIG. 5 with an alternative non-limiting example of display page of a graphical user interface displayed thereon.

In yet a further alternative embodiment, the user may create his or her own user-defined ambiance setting without having to start from an existing ambiance setting. In such a case, the user may be provided with a graphical user interface that provides the user with the ability to create a user-defined ambiance setting. A non-limiting example of a graphical user interface 104 for allowing a user to create a user-defined ambiance setting is shown in FIG. 11. The graphical user interface 104 comprises a first input area 106 for allowing the user to provide a first desired operational setting, which in the example shown is a desired temperature, a second input area 108 for allowing the user to provide a second desired operational setting, which in the example shown is an indication of which pumps the user would like to be active, a third input area 110 for receiving from a user an indication of a third desired operational setting, which in the example shown is the lighting devices the user would like to be active, and a fourth input area 112 for allowing the user to provide a fourth desired operational setting, which in the example shown is an indication of which internet radio station the user would like to have playing. It should be appreciated that more or less input areas could be provided in order to provide a greater or lesser number of different types of bathing unit components for which a user can enter a desired operational setting.

It should be appreciated that it is not necessary for a user to enter a desired operational setting for each type of bathing unit component. For example, the user may leave a given input area blank, such that the bathing unit components for that type of bathing unit component are not active, or an automatic operational setting is implemented by the bathing unit components of that type.

The graphical user interface 104 may also comprise an input area 114 for receiving a title of the ambiance setting. For example, the title may be "Jen's favorites" or "Friday night bathing". The graphical user interface 104 may further comprises an input area 113 for allowing the user to enter a desired icon or picture. In the example shown, the user interface includes a "browse" button, such that a user can access an icon or picture from a stored memory unit that is located either locally, or on a network server.

The graphical user interface 104 further comprises an input area 116 for receiving from the user an indication that the entered operational settings should be stored in association with the user-defined ambiance setting that has been given a title in input area 114. This user-defined ambiance setting will then be added to the list of user-defined ambiance settings that is displayed on a display page such as that described above with respect to FIG. 5.

CONCLUSION

Those skilled in the art will appreciate that various modifications and refinements can be made to the embodiments presented above without detracting from the scope of the present invention.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A device for monitoring and controlling a bathing unit system having a set of bathing unit components, the device comprising:
   a) a display screen;
   b) at least one processor in communication with the display screen, the at least one processor being programmed for:
      i) presenting a graphic user interface (GUI) on the display screen, the GUI configured to present information associated with the bathing unit system, the information associated with the bathing unit system concurrently conveying:
         i) operational status information for a first bathing unit component in the set of bathing unit components of the bathing unit system, the first bathing unit component being a bathing unit component of a first type; and
         ii) operational status information for a second bathing unit component in the set of bathing unit components of the bathing unit system, the second bathing unit component being a bathing unit component of a second type different from the first type;
      ii) the GUI being configured for presenting one or more user operable inputs with the information associated with the bathing unit system, the one or more user operable inputs allowing a user to issue operational settings adjustment commands for adjusting operational settings associated with the bathing unit system;
      iii) receiving data originating from the bathing unit system and conveying monitored operational parameters associated with the bathing unit system;
      iv) in response to detection of specific operational changes in the bathing unit system at least in part by processing the data received from the bathing unit system, dynamically adapting the graphic user interface (GUI) on the display screen to present updated operational status information.

2. A device as defined in claim 1, wherein the device is configured for establishing a network connection with the bathing unit system, and wherein the at least one processor is programmed for receiving the data conveying monitored operational parameters associated with the bathing unit system over the network connection.

3. A device as defined in claim 2, wherein the device is implemented by a portable device.

4. A device as defined in claim 2, further comprising an output for releasing a signal to the bathing unit system over the network connection for causing bathing unit components in the bathing unit system to acquire operational settings specified by operational settings adjustment commands issued by the user through the GUI.

5. A device as defined in claim 1, wherein at least some of the data originating from the bathing unit system conveys information on usage of the bathing unit system.

6. The define defined in claim 1, wherein:
   a) the first bathing unit component of the first type is one of a water pump, a lighting unit, a water jet, a heating device, a sanitization device and an audio/visual component; and
   b) the second bathing unit component of the second type is different from the first bathing unit component of the first type and is one of a water pump, a lighting unit, a water jet, a heating device, a sanitization device and an audio/visual component.

7. A device as defined in claim 1, wherein the first bathing unit component is a heater and wherein the updated operational status information conveys:
   a) a desired water temperature; and
   b) a measured water temperature.

8. A device as defined in claim 1, wherein the first bathing unit component is a heater and the second bathing unit component includes at least one a water pump, water jets, a lighting unit, a sanitization device and a filter.

9. A device as defined in claim 8, wherein the user operable inputs include specific user operable inputs for allowing the user to issue operational settings adjustment commands for adjusting operational settings associated with the heater and the at least one of the water pump and the lighting unit.

10. A device as defined in claim 8, wherein the at least one processor being programmed for, following receipt of a specific operational settings adjustment command provided by the user through the user operable inputs, the specific operational settings command conveying a desired adjustment to an operational setting associated with a specific bathing unit component, transmitting a signal to the bathing unit system for causing the desired adjustment to be implemented by the specific bathing unit component, wherein the specific bathing unit component is one of the first bathing unit component and the second bathing unit component.

11. A device as defined in claim 1, wherein the first bathing unit component is a heater and wherein the updated operational status information conveys a measured water temperature and at least one of:
   a) a current usage status for the bathing unit system;
   b) a current water filtration status for the bathing unit system; and
   c) a current sanitization status for the bathing unit system.

12. A device as define in claim 1, wherein at least some of the data originating from the bathing unit system conveys error messages for the bathing unit system.

13. A device as define in claim 12, wherein the error messages for the bathing unit system convey at least one of:
   a) a blockage in the circulation pipes;
   b) a malfunction in a filter;
   c) a malfunction of a heater; and
   d) an overheat condition.

14. A device as define in claim 1, wherein the updated operational status information conveys required maintenance information for the bathing unit system.

15. A device as define in claim 14, wherein the required maintenance information for the bathing unit system conveys that a filter requires changing.

16. A device as defined in claim 1, wherein the display screen is part of a top-side control panel of the bathing unit system.

17. A device for monitoring and controlling a bathing unit system having a set of bathing unit components, the device comprising:
   a) a display screen;
   b) at least one processor in communication with the display screen, the at least one processor being programmed for:
      i) presenting a graphic user interface (GUI) on the display screen, the GUI configured to present information associated with the bathing unit system, the information associated with the bathing unit system concurrently conveying:
         i) operational status information for a first bathing unit component in the set of bathing unit components of the bathing unit system, the first bathing unit component being a bathing unit component of a first type; and
         ii) operational status information for a second bathing unit component in the set of bathing unit components of the bathing unit system, the second bathing unit component being a bathing unit component of a second type different from the first type;
      ii) the GUI being configured for presenting one or more user operable inputs with the information associated with the bathing unit system, the one or more user operable inputs allowing a user to issue operational settings adjustment commands for adjusting operational settings associated with the bathing unit system, wherein the user operable inputs presented on the GUI are customized at least in part based upon a user-selected ambience setting;
      iii) receiving data originating from the bathing unit system and conveying monitored operational parameters associated with the bathing unit system;
      iv) in response to detection of specific operational changes in the bathing unit system at least in part by processing the data received from the bathing unit system, dynamically adapting the graphic user interface (GUI) on the display screen to present updated operational status information.

18. A device for monitoring and controlling a bathing unit system having a set of bathing unit components, the device comprising:
   a) a display screen;
   b) at least one processor in communication with the display screen, the at least one processor being programmed for:
      i) presenting a graphic user interface (GUI) on the display screen, the GUI configured to present information associated with the bathing unit system, the information associated with the bathing unit system concurrently conveying:
         (1) operational status information for a first bathing unit component in the set of bathing unit components of the bathing unit system, the first bathing unit component being a bathing unit component of a first type; and
         (2) operational status information for a second bathing unit component in the set of bathing unit components of the bathing unit system, the second bathing unit component being a bathing unit component of a second type different from the first type, wherein:
            a) the first bathing unit component is a heater and wherein the updated operational status information conveys a water temperature; and
            b) the second bathing unit component is an audio/visual component and wherein the updated operational status information conveys information pertaining to media content;
      ii) the GUI being configured for presenting one or more user operable inputs with the information associated with the bathing unit system, the one or more user operable inputs allowing a user to issue operational settings adjustment commands for adjusting operational settings associated with the bathing unit system;
      iii) receiving data originating from the bathing unit system and conveying monitored operational parameters associated with the bathing unit system;
      iv) in response to detection of specific operational changes in the bathing unit system at least in part by processing the data received from the bathing unit system, dynamically adapting the graphic user interface (GUI) on the display screen to present updated operational status information.

19. A device as defined in claim 18, wherein the information pertaining to media content conveys a status corresponding to a play-list.

20. A device as defined in claim 19, wherein the status corresponding to the play-list includes an alert that the play-list has come to an end.

21. A device as defined in claim 18, wherein the information pertaining to media content conveys an audio/visual status of the audio/visual component.

22. A device for monitoring a bathing unit system having a set of bathing unit components, the device comprising:
   a) a display screen;
   b) at least one processor in communication with the display screen, wherein the at least one processor is further programmed for:
      i) presenting a graphic user interface (GUI) on the display screen, the GUI configured to concurrently present operational status information for at least a first bathing unit component and a second bathing unit component in the set of bathing unit components of the bathing unit, the first bathing unit component being a bathing unit component of a first type and the second bathing unit component being a bathing unit component of a second type different from the first type;
      ii) receiving data originating from the bathing unit system and conveying monitored operational parameters associated with the bathing unit system;
      iii) in response to detection of specific operational changes in the bathing unit system at least in part by processing the data received from the bathing unit system, dynamically adapting the graphic user interface (GUI) on the display screen to present updated operational status information;
      v) deriving a specific maintenance schedule conveying when at least one future maintenance activity is to be performed at least in part by processing data conveying that a specific maintenance activity has been performed on the bathing unit system;
      vi) in dependence of the derived specific maintenance schedule, dynamically adapting the GUI to present a maintenance notification message conveying the at least one future maintenance activity concurrently with the updated operational status information.

23. A method for monitoring and controlling a bathing unit system having a set of bathing unit components, the method being implemented by a device suitable for establishing a network connection with the bathing unit system, the device including a display screen and at least one processor in communication with the display screen, said method comprising:
   a) presenting a graphic user interface (GUI) on the display screen, the GUI configured to present information associated with the bathing unit system, the information associated with the bathing unit system concurrently conveying:
      i) operational status information for a first bathing unit component in the set of bathing unit components of the bathing unit system, the first bathing unit component being a bathing unit component of a first type; and
      ii) operational status information for a second bathing unit component in the set of bathing unit components of the bathing unit system, the second bathing unit component being a bathing unit component of a second type different from the first type;
   b) the GUI being configured for presenting one or more user operable inputs with the information associated with the bathing unit system, the one or more user operable inputs allowing a user to issue operational settings adjustment commands for adjusting operational settings associated with the bathing unit system;
   c) receiving data over the network connection originating from the bathing unit system and conveying monitored operational parameters associated with the bathing unit system;
   d) in response to detection of specific operational changes in the bathing unit system at least in part by processing the data received from the bathing unit system, dynamically adapting the graphic user interface (GUI) on the display screen to present updated operational status information.

24. A method as defined in claim 23, wherein the device is implemented by a portable device.

25. A method as defined in claim 24, wherein the portable device is one of a smartphone and a tablet device.

26. A non-transitory computer readable storage media comprising a computer program having instructions stored on the media, wherein the instructions, when executed, cause a programmable device including a display screen and at least one programmable processor to perform operations for assisting a user in monitoring and controlling a bathing unit system having a set of bathing unit components, the operations comprising:
   a) presenting a graphic user interface (GUI) on the display screen, the GUI configured to present information associated with the bathing unit system, the information associated with the bathing unit system conveying:
      i) operational status information for a first bathing unit component in the set of bathing unit components of the bathing unit system, the first bathing unit component being a bathing unit component of a first type; and
      ii) operational status information for a second bathing unit component in the set of bathing unit components of the bathing unit system, the second bathing unit component being a bathing unit component of a second type different from the first type;
   b) the GUI being configured for presenting one or more user operable inputs with the information associated with the bathing unit system, the one or more user operable inputs allowing the user to issue operational settings adjustment commands for adjusting operational settings associated with the bathing unit system;
   c) receiving data originating from the bathing unit system and conveying monitored operational parameters associated with the bathing unit system;
   d) in response to detection of specific operational changes in the bathing unit system at least in part by processing the data received from the bathing unit system, dynamically adapting the graphic user interface (GUI) on the display screen to present updated operational status information.

* * * * *